(12) United States Patent
Dua et al.

(10) Patent No.: US 12,505,336 B2
(45) Date of Patent: Dec. 23, 2025

(54) SYSTOLIC-CNN: AN OPENCL-DEFINED SCALABLE RUNTIME-FLEXIBLE PROGRAMMABLE ACCELERATOR ARCHITECTURE FOR ACCELERATING CONVOLUTIONAL NEURAL NETWORK INFERENCE IN CLOUD/EDGE COMPUTING

(71) Applicant: ARIZONA BOARD OF REGENTS ON BEHALF OF ARIZONA STATE UNIVERSITY, Scottsdale, AZ (US)

(72) Inventors: Akshay Dua, San Jose, CA (US); Fengbo Ren, Tempe, AZ (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 1244 days.

(21) Appl. No.: 17/243,136

(22) Filed: Apr. 28, 2021

(65) Prior Publication Data

US 2021/0334636 A1 Oct. 28, 2021

Related U.S. Application Data

(60) Provisional application No. 63/016,434, filed on Apr. 28, 2020.

(51) Int. Cl.
*G06N 3/063* (2023.01)
*G06N 3/045* (2023.01)
*G06N 3/08* (2023.01)

(52) U.S. Cl.
CPC ............. *G06N 3/063* (2013.01); *G06N 3/045* (2023.01); *G06N 3/08* (2013.01)

(58) Field of Classification Search
CPC .......... G06N 3/063; G06N 3/045; G06N 3/08; G06N 3/048
See application file for complete search history.

(56) References Cited

U.S. PATENT DOCUMENTS 12,039,448 B2 * 7/2024 Partovi Nia ........... G06N 3/084
2020/0089506 A1 * 3/2020 Power ..................... G06V 10/95

OTHER PUBLICATIONS

Venieris et al. (Toolflows for Mapping Convolutional Neural Networks on FPGAs: A Survey and Future Directions. ACM Computing Surveys, vol. 51, No. 3, Article 56, published Jun. 2018, 39 pages). (Year: 2018).*

(Continued)

*Primary Examiner* — Tan H Tran
(74) *Attorney, Agent, or Firm* — MH2 Technology Law Group, LLP

(57) ABSTRACT

An OpenCL-defined scalable runtime-flexible programmable accelerator architecture for accelerating convolutional neural network (CNN) inference in cloud/edge computing is provided, referred to herein as Systolic-CNN. Existing OpenCL-defined programmable accelerators (e.g., field-programmable gate array (FPGA)-based accelerators) for CNN inference are insufficient due to limited flexibility for supporting multiple CNN models at runtime and poor scalability resulting in underutilized accelerator resources and limited computational parallelism. Systolic-CNN adopts a highly pipelined and paralleled one-dimensional (1-D) systolic array architecture, which efficiently explores both spatial and temporal parallelism for accelerating CNN inference on programmable accelerators (e.g., FPGAs). Systolic-CNN is highly scalable and parameterized, and can be easily adapted by users to efficiently utilize the coarse-grained computation resources for a given programmable accelerator. In addition, Systolic-CNN is runtime-flexible and can be time-shared to accelerate a variety of CNN models at runtime without the need to recompile the programmable accelerator kernel hardware or reprogram the programmable accelerator.

20 Claims, 13 Drawing Sheets

(56) References Cited

OTHER PUBLICATIONS

Rao et al. (Runtime Network Routing for Efficient Image Classification, IEEE Transactions on Pattern Analysis and Machine Intelligence, vol. 41, Issue: 10, published Oct. 26, 2018, pp. 2291-2304). (Year: 2018).*
Aydonat, U. et al., "An OpenCL™ Deep Learning Accelerator on Arria 10," Proceedings of the 2017 ACM/SIGDA International Symposium on Field-Programmable Gate Arrays (FPGA '17), Feb. 22-24, 2017, Monterey, CA, USA, ACM, 10 pages.
Abdelouahab, K. et al., "Accelerating CNN inference on FPGAs: A Survey," arXiv:1806.01683v1 [cs.DC], May 26, 2018, 30 pages.
Azizimazreah, A. et al., "Shortcut Mining: Exploiting Cross-layer Shortcut Reuse in DCNN Accelerators," 2019 IEEE International Symposium on High Performance Computer Architecture (HPCA), Feb. 16-20, 2019, Washington, DC, USA, IEEE, 12 pages.
Colangelo, P. et al., "Exploration of Low Numeric Precision Deep Learning Inference Using Intel® FPGAs," 2018 IEEE 26th Annual International Symposium on Field-Programmable Custom Computing Machines (FCCM), Apr. 29-May 1, 2018, Boulder, CO, USA, IEEE, 8 pages.
Ma, Y. et al., "Optimizing Loop Operation and Dataflow in FPGA Acceleration of Deep Convolutional Neural Networks," Proceedings of the 2017 ACM/SIGDA International Symposium on Field-Programmable Gate Arrays, Feb. 2017, ACM, 10 pages.
Ma, Y. et al., "Optimizing the Convolution Operation to Accelerate Deep Neural Networks on FPGA," IEEE Transactions on Very Large Scale Integration (VLSI) Systems, vol. 26, Issue 7, Jul. 2018, IEEE, 14 pages.
Nguyen, D. et al., "A High-Throughput and Power-Efficient FPGA Implementation of YOLO CNN for Object Detection," IEEE Transactions on Very Large Scale Integration (VLSI) Systems, vol. 27, Issue 8, Aug. 2019, IEEE, 13 pages.
Redmon, J. et al., "YOLO9000: Better, Faster, Stronger," 2017 IEEE Conference on Computer Vision and Pattern Recognition, Jul. 21-26, 2017, IEEE, pp. 6517-6525.
Solovyev, R. et al., "FPGA Implementation of Convolutional Neural Networks with Fixed-Point Calculations," arXiv:1808.09945v1 [cs.CV], Aug. 29, 2018, 9 pages.
Suda, N. et al., "Throughput-Optimized OpenCL-based FPGA Accelerator for Large-Scale Convolutional Neural Networks," Proceedings of the 2016 ACM/SIGDA International Symposium on Field-Programmable Gate Arrays (FPGA'16), Feb. 21-23, 2016, Monterey, CA, USA, ACM, 10 pages.
Wang, D. et al., "PipeCNN: An OpenCL-Based Open-Source FPGA Accelerator for Convolution Neural Networks," 2017 International Conference on Field Programmable Technology (ICFPT), Dec. 11-13, 2017, Melbourne, VIC, Australia, IEEE, 4 pages.
Wei, X. et al., "Automated Systolic Array Architecture Synthesis for High Throughput CNN Inference on FPGAs," 2017 54th ACM/EDAC/IEEE Design Automation Conference (DAC '17), Jun. 18-22, 2017, Austin, TX, USA, ACM, 6 pages.
Zhang, C. et al., "Optimizing FPGA-based Accelerator Design for Deep Convolutional Neural Networks," Proceedings of the 2015 ACM/SIGDA International Symposium on Field-Programmable Gate Arrays, Feb. 2015, ACM, pp. 161-170.
Zhang, J. et al., "Frequency Improvement of Systolic Array-Based CNNs on FPGAs," 2019 IEEE International Symposium on Circuits and Systems (ISCAS), May 2019, Sapporo, Japan, IEEE, 4 pages.
Zhao, R. et al., "Optimizing CNN-based Object Detection Algorithms on Embedded FPGA Platforms," International Symposium on Applied Reconfigurable Computing, Mar. 2017, 12 pages.
Zohouri, H. et al., "Combined Spatial and Temporal Blocking for High-Performance Stencil Computation on FPGAs Using OpenCL," 2018 ACM/SIGDA International Symposium on Field-Programmable Gate Arrays (FPGA'18), Feb. 25-27, 2018, Monterey, CA, USA, ACM, 10 pages.

* cited by examiner

```
1  for i = 0 to op_dim
2  for j = 0 to ic_dim
3  for y = 0 to col_dim
4  for x = 0 to row_dim
5  for m1 = 0 to K
6  for m2 = 0 to K
7    output[i][y][x] += ...
8    ip[j][y+m1][x+m2] * w[i][j][m1][m2]
```

FIG. 5

```
1  for i = 0 to op_dim/pe_num
2  for j = 0 to ic_dim/vec_fac
3  for y = 0 to col_dim
4  for x = 0 to row_dim/reuse_fac
5  for m1 = 0 to K
6  for m2 = 0 to K
7    #pragma unroll
8  for p = 0 to pe_num
9    #pragma unroll
10 for v = 0 to vec_fac
11   #pragma unroll
12 for r = 0 to reuse_fac
13   output[i*pe_num+p][y][x*reuse_fac+r] += ...
14   ip[j*vec_fac+v][y+m1][x*reuse_fac+r+m2] ...
15   *w[i*pe_num+p][j*vec_fac+v][m1][m2]
```

FIG. 6

SYSTOLIC-CNN: AN OPENCL-DEFINED SCALABLE RUNTIME-FLEXIBLE PROGRAMMABLE ACCELERATOR ARCHITECTURE FOR ACCELERATING CONVOLUTIONAL NEURAL NETWORK INFERENCE IN CLOUD/EDGE COMPUTING

RELATED APPLICATIONS

This application claims the benefit of provisional patent application Ser. No. 63/016,434, filed Apr. 28, 2020, the disclosure of which is hereby incorporated herein by reference in its entirety.

FIELD OF THE DISCLOSURE

This disclosure relates to acceleration of machine learning algorithms on hardware.

BACKGROUND

With the exponential growth in video content over the last few years, analysis of video data is becoming more crucial for many applications such as self-driving cars, healthcare, and traffic management. Most video analysis applications use deep learning algorithms, such as convolution neural networks (CNNs), because of their high accuracy in object detection. Thus, enhancing the performance of CNN models becomes crucial for video analysis. CNNs are a subcategory of deep neural network models. CNNs can extract and learn spatial information automatically to process image classification and object detection tasks.

Field-programmable gate arrays (FPGAs) offer superior hardware flexibility and energy efficiency that have attracted many researchers and developers to use FPGAs for accelerating CNN inference for computer vision tasks. The conventional development flow of FPGAs relies on designing FPGA hardware at the register-transfer level (RTL). Although it allows the fine control of resource utilization for precise performance improvement, large efforts are needed in design and verification, making architecture design space exploration time-consuming.

OpenCL is an open standard for the parallel programming of heterogeneous systems. OpenCL kernel language is a C++-based parallel programming language that is currently supported by a variety of computing devices, including central processing units (CPUs), graphics processing units (GPUs), digital signal processors (DSPs), FPGAs, etc. Traditional FPGA design requires the use of a hardware description language (HDL), making FPGA out of the reach of application developers. The prevalence of high-level synthesis (HLS) technology in recent years finally makes it possible to develop FPGA kernel functions in C/C++/OpenCL, making FPGAs possible accelerators for general-purpose computing.

HLS tools, such as the Intel FPGA software development kit (SDK) for OpenCL, allow function modeling at a much higher level, thus enabling a faster design and verification cycle. These HLS tools also provide a rich set of synthesis attributes and directives that facilitate efficient architecture design space exploration. There has been a lot of recent work on accelerating CNNs on FPGAs using OpenCL showing promising performance. Nevertheless, these works suffer from two major limitations that make them insufficient for realizing acceleration-as-a-service for multitenancy cloud or edge computing: 1) lack of flexibility for supporting multiple CNN models at runtime; and 2) poor scalability resulting in underutilized FPGA resources and limited computational parallelism.

SUMMARY

An OpenCL-defined scalable runtime-flexible programmable accelerator architecture for accelerating convolutional neural network (CNN) inference in cloud/edge computing is provided, referred to herein as Systolic-CNN. Existing OpenCL-defined programmable accelerators (e.g., field-programmable gate array (FPGA)-based accelerators) for CNN inference are insufficient due to limited flexibility for supporting multiple CNN models at runtime and poor scalability resulting in underutilized accelerator resources and limited computational parallelism. Systolic-CNN adopts a highly pipelined and paralleled one-dimensional (1-D) systolic array architecture, which efficiently explores both spatial and temporal parallelism for accelerating CNN inference on programmable accelerators (e.g., FPGAs).

Systolic-CNN is highly scalable and parameterized, and can be easily adapted by users to achieve up to 100% utilization of the coarse-grained computation resources (e.g., digital signal processing (DSP) blocks) for a given programmable accelerator. In addition, Systolic-CNN is runtime-flexible and can be time-shared (e.g., in the context of multi-tenancy cloud or edge computing) to accelerate a variety of CNN models at runtime without the need to recompile the programmable accelerator kernel hardware or reprogram the programmable accelerator.

Evaluation results on an Intel Arria/Stratix 10 GX FPGA development board show that Systolic-CNN, when mapped with a single-precision data format, can achieve 100% utilization of the DSP block resource. Results further show an average inference latency of 7 milliseconds (ms)/2 ms, 84 ms/33 ms, 202 ms/73 ms, 1615 ms/873 ms, and 900 ms/498 ms per image for accelerating AlexNet, ResNet-50, ResNet-152, RetinaNet, and Light-weight RetinaNet, respectively. The peak computational throughput is measured at 80-210 giga floating point operations per second (GFLOPS/s) and 242-700 GFLOPS/s for accelerating different single-precision CNN models on the Arria/Stratix 10 FPGA board.

An exemplary embodiment provides a method for accelerating a CNN process on a programmable accelerator. The method includes establishing on the programmable accelerator a convolution layer and additional layers which are runtime-flexible for a plurality of CNN models without recompiling the programmable accelerator; receiving a first request to perform a first CNN inference process; and at runtime, accelerating the first CNN inference process using the convolution layer and the additional layers with spatial and temporal parallel execution.

Another exemplary embodiment provides a deep learning system. The deep learning system includes a programmable accelerator; and a memory storing instructions which, when executed, cause the programmable accelerator to: establish processing resources on the programmable accelerator which are runtime-flexible for a plurality of CNN models; receive a request to perform a CNN inference process using one of the plurality of CNN models; and perform the CNN inference process with the processing resources without recompiling the programmable accelerator.

Another exemplary embodiment provides a CNN accelerator architecture. The CNN accelerator architecture includes a one-dimensional (1-D) systolic array of processing elements (PEs) configured to execute a convolution layer of a CNN; and an additional layer module configured to provide optional computations for the CNN; wherein the CNN accelerator architecture is configured to accelerate a plurality of types of CNNs on a programmable accelerator at runtime without reconfiguring the programmable accelerator.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 5 illustrates an example of pseudo code for a standard convolutional layer.

FIG. 6 illustrates an example of pseudo code for a convolutional layer with three architectural parameters implemented.

DETAILED DESCRIPTION

Figure 1:
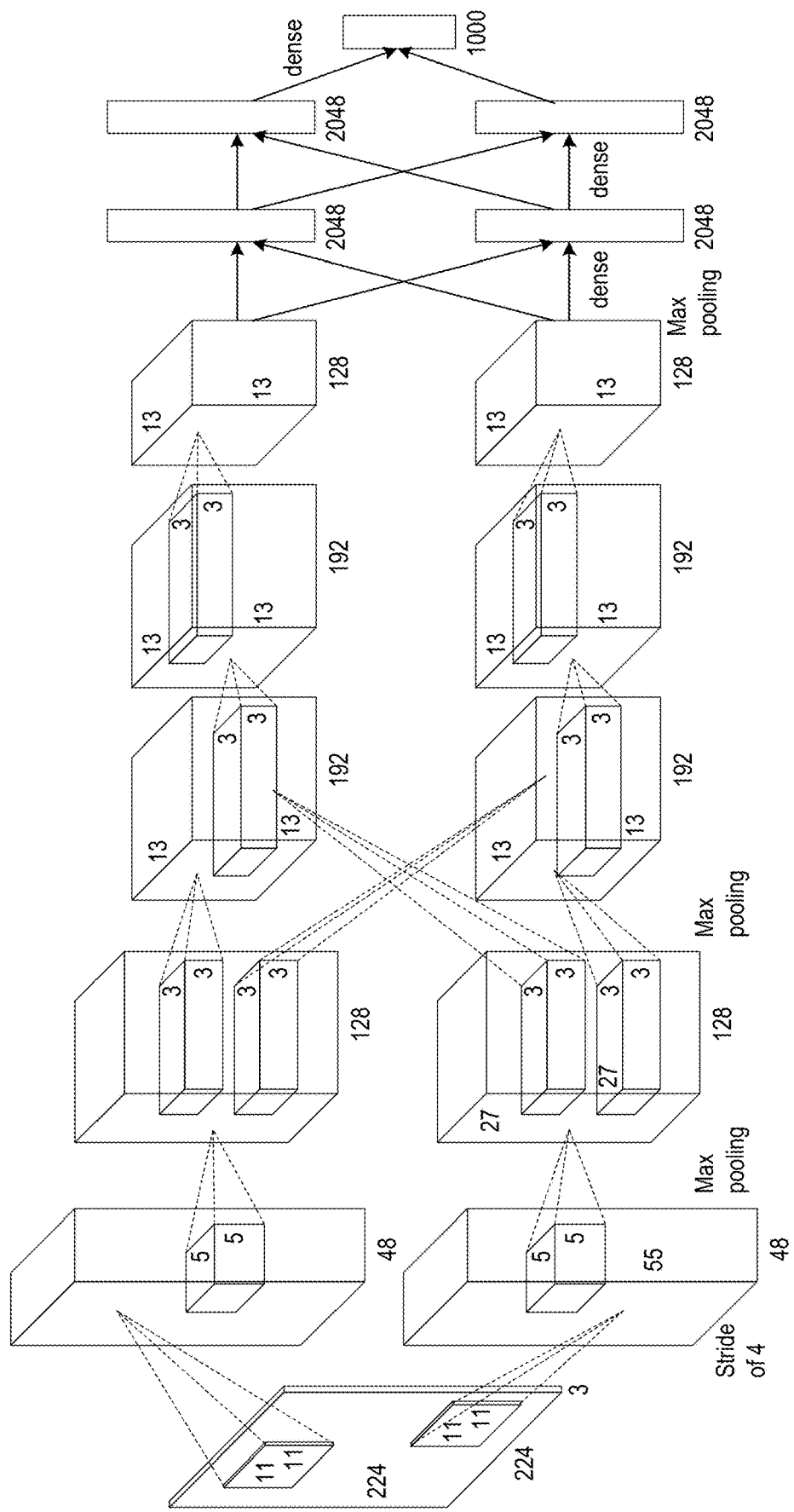
FIG. 1 is a schematic diagram illustrating the architecture of AlexNet.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

An OpenCL-defined scalable runtime-flexible programmable accelerator architecture for accelerating convolutional neural network (CNN) inference in cloud/edge computing is provided, referred to herein as Systolic-CNN. Existing OpenCL-defined programmable accelerators (e.g., field-programmable gate array (FPGA)-based accelerators) for CNN inference are insufficient due to limited flexibility for supporting multiple CNN models at runtime and poor scalability resulting in underutilized accelerator resources and limited computational parallelism. Systolic-CNN adopts a highly pipelined and paralleled one-dimensional (1-D) systolic array architecture, which efficiently explores both spatial and temporal parallelism for accelerating CNN inference on programmable accelerators (e.g., FPGAs).

Systolic-CNN is highly scalable and parameterized, and can be easily adapted by users to achieve up to 100% utilization of the coarse-grained computation resources (e.g., digital signal processing (DSP) blocks) for a given programmable accelerator. In addition, Systolic-CNN is runtime-flexible and can be time-shared (e.g., in the context of multi-tenancy cloud or edge computing) to accelerate a variety of CNN models at runtime without the need to recompile the programmable accelerator kernel hardware or reprogram the programmable accelerator.

Evaluation results on an Intel Arria/Stratix 10 GX FPGA development board show that Systolic-CNN, when mapped with a single-precision data format, can achieve 100% utilization of the DSP block resource. Results further show an average inference latency of 7 milliseconds (ms)/2 ms, 84 ms/33 ms, 202 ms/73 ms, 1615 ms/873 ms, and 900 ms/498 ms per image for accelerating AlexNet, ResNet-50, ResNet-152, RetinaNet, and Light-weight RetinaNet, respectively. The peak computational throughput is measured at 80-210 giga floating point operations per second (GFLOPS/s) and 242-700 GFLOPS/s for accelerating different single-precision CNN models on the Arria/Stratix 10 FPGA board.

I. Introduction

A. CNN Architecture

CNNs are a subcategory of deep learning, and designing an accelerator for CNNs is the primary focus of this disclosure. Image classification-based applications mostly use CNNs. CNNs re-utilize weights across an input feature map (IFM) to extract the spatial dependencies between different pixel values of the IFM. CNNs typically consist of convolutional layers, fully-connected layers, pooling layers, and non-linearity layers. Among them, convolutional layers consume most of the computations. The convolutional kernels slide over the IFMs and compute the inner-products for output feature maps. Embodiments described herein use both spatial and temporal parallelism to perform high-throughput convolutions.

This disclosure presents the performance of five CNN architectures, namely AlexNet (as described in Alex Krizhevsky, Ilya Sutskever, and Geoffrey E Hinton, "Imagenet Classification with Deep Convolutional Neural Networks," in *Advances in Neural Information Processing Systems*, pp. 1097-1105, 2012), ResNet-50 and ResNet-152 (as described in Kaiming He, Xiangyu Zhang, Shaoqing Ren, and Jian Sun, "Deep Residual Learning for Image Recognition," in *Proceedings of the IEEE Conference on Computer Vision and Pattern Recognition*, pp. 770-778, 2016), RetinaNet (as described in Tsung-Yi Lin, Priya Goyal, Ross Girshick, Kaiming He, and Piotr Dollar, "Focal Loss for Dense Object Detection," in *Proceedings of the IEEE International Conference On Computer Vision*, pp. 2980-2988, 2017), and Light-weight RetinaNet (as described in Yixing Li and Fengbo Ren, "Light-Weight RetinaNet for Object Detection on Edge Devices", in *The IEEE World Forum on Internet of Things* (WF-IoT'20), 2020), using embodiments of Systolic-CNN to demonstrate the compatibility of its design with a wide variety of CNN architectures.

FIG. 1 is a schematic diagram illustrating the architecture of AlexNet. The AlexNet CNN model consists of five convolution layers, two local response normalization (LRN) layers, two max pooling layers, and three fully connected layers. This model contains over 62.4 million parameters and requires 1.1 billion computations for performing an inference on a 227×227×3 image.

Figure 2:
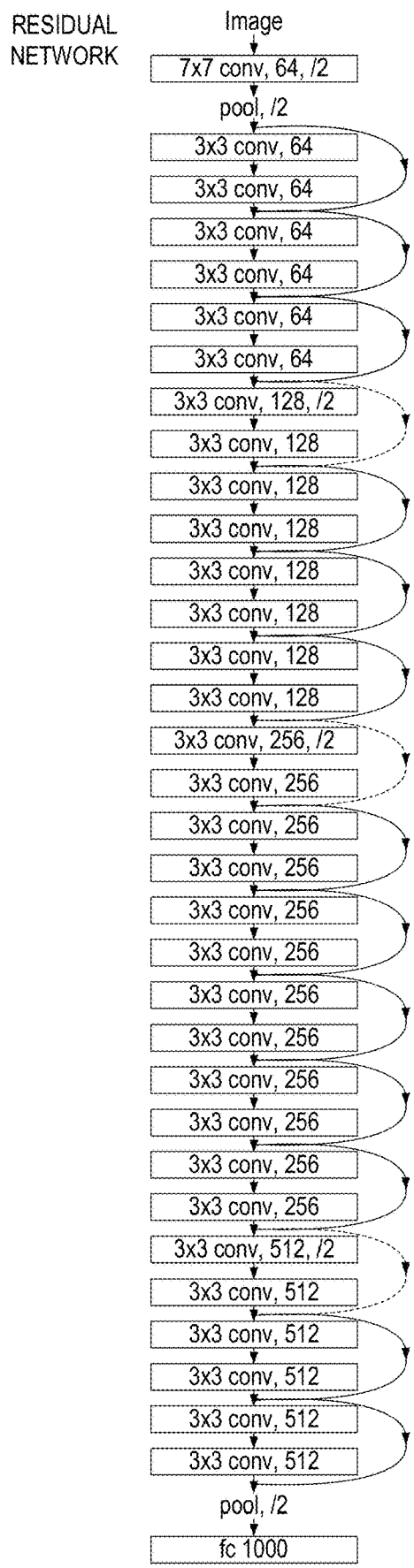
FIG. 2 is a schematic diagram illustrating the architecture of ResNet.

FIG. 2 is a schematic diagram illustrating the architecture of ResNet. Multiple residual neural networks were proposed in this work, namely ResNet-18, ResNet-34, ResNet-50, ResNet-101, and ResNet-152. The ResNet-50 architecture trained for a 224×224×3 image size originally has around 25 million parameters with forty-nine convolutions, one fully connected layer, one average pooling, and one max pooling. The significant advantage of using deep residual neural networks is the solution to the problem of degraded neural network performance when there is an increase in the number of layers.

Figure 3:
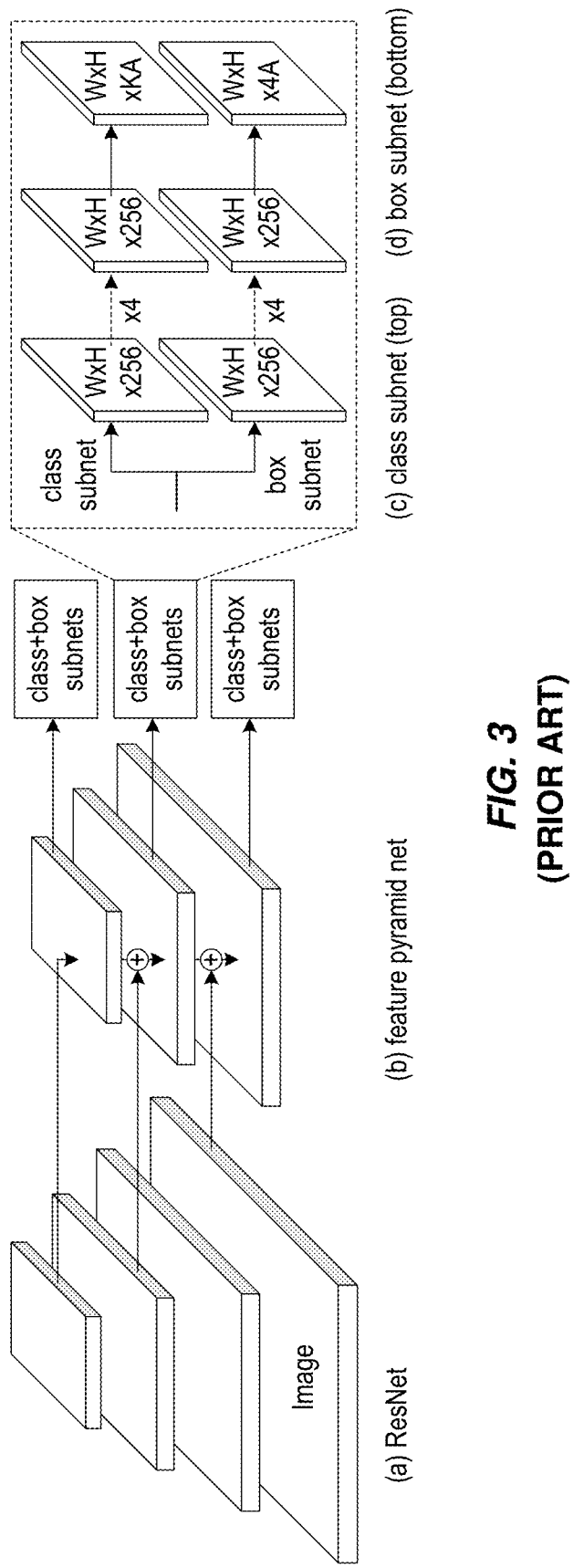
FIG. 3 is a schematic diagram illustrating the architecture of RetinaNet.

FIG. 3 is a schematic diagram illustrating the architecture of RetinaNet. RetinaNet is the CNN architecture used by video-analytics based applications for object detection. The RetinaNet model's inference phase is divided into three parts. The first part acts as the backbone that proposes regions for object detection, followed by a feature pyramid network (FPN) that generates four feature maps by merging the top layers with the bottom ones. The output of the FPN is used to generate bounding box regression and classify objects in the image. RetinaNet performs 156 giga floating point operations (GFLOPS) on the image size of 800×800×3 for detecting objects in a given image.

Light-weight RetinaNet is a modified version of the RetinaNet CNN model. The underlying architecture of Light-weight RetinaNet is similar to the original RetinaNet and can be inferred from FIG. 3. The idea behind Light-weight RetinaNet is to reduce the number of floating point operations (FLOPS) by identifying the most computationally expensive layer and reducing filter size given there is no drop in the accuracy. This model reduces the number of FLOPS by 1.8 times as compared to the original RetinaNet CNN architecture.

B. CNN Layers

To ensure that the Systolic-CNN design described herein is compatible with different CNN models, multiple CNN layers are included along with convolution, namely, batch normalization (BNORM), LRN, max/average pooling (POOL), element-wise sum (ELTWISE), fully connected (FC), and rectified linear unit (ReLU) layers for the inference phase of CNN models.

Convolution: The core operation of a CNN-based model is convolution. The number of layers in CNN models increases as they become dense, which increases the percentage of the convolution computations. The AlexNet CNN model, with five convolution layers, has 90% of its computations as convolution that increase in the ResNet-50 CNN model to 99%. As a result, accelerating convolution becomes crucial for Systolic-CNN. The convolution is a three-dimensional (3-D) multiplication and accumulation of the IFMs and weights and is known to be the computationally expensive layer. Equation 1 represents the formula for convolution:

$$\text{output}(oc, y, x) = \Sigma_{n=0}^{ic} \Sigma_{n1=0}^{K} \Sigma_{n2=0}^{K} \text{inp}(n, y+n1, x+n1) \times w(oc, n, n1, n2) \quad \text{Equation 1}$$

where the output(oc, y, x) is the output generated at x row, y column at oc channel, which is calculated after multiplying and accumulating the weights of K×K size with the IFM at x row and y column. Another factor to consider with convolution is stride, which determines the shift of the window of the weight along the rows and columns of the IFM.

LRN: The LRN layer is used by earlier CNN models such as AlexNet to normalize the IFMs. Normalization also depends on the neighboring elements of the IFM. It generates an output feature map of the same dimension as the IFMs with the normalized result written at the same coordinate position as the corresponding IFM. The LRN layer uses Equation 2 to normalize the IFMs:

$$\text{output}(i, y, x) = \frac{\text{input}(i, y, x)}{\left(k + \alpha \times \sum_{j=max(0, i-\frac{n}{2})}^{min(N-1, i+\frac{n}{2})} (\text{input}(j, y, x)^2)\right)^\beta} \quad \text{Equation 2}$$

where parameters n, α, β, and k are trainable parameters, and are fixed for inference phase. The parameter N is the input channel dimension that varies layer to layer.

POOL: The pooling layers are used by CNN models for down-sampling the IFMs, such that the dimension of each feature map reduces by some factor, which is determined by the pooling filter dimension ($K_p \times K_r$), and stride factor. The two types of pooling, which are generally used by CNN models and supported by the design of embodiments herein, are 1) average-pooling, and 2) max pooling. Equations 3 and 4 show the functionality of average and max pooling, respectively:

$$\text{output}(i, y, x) = \Sigma_{n=0}^{n=K_p} \Sigma_{n1=0}^{n1=K_p} \text{input}(i, y+n, x+n1)/(K_p \times K_p) \quad \text{Equation 3}$$

$$\text{output}(i, y, x) = \max(\text{input}(i, y+K_p, x+K_p)) \quad \text{Equation 4}$$

BNORM: BNORM is a more commonly used layer than LRN for normalization. It can replace the LRN layer mainly because of the higher learning rate. For example, in ResNet-50, every convolution layer is followed by the BNORM layer. BNORM output, similar to LRN, is of the same dimension as the IFM dimension. In LRN, the normalized output depends on the neighboring elements of the input. However, in the BNORM layer, the output at position (y, x) only depends on the input at the position (y, x). Equation 5 represents the formula for BNORM:

$$\text{output}(i, y, x) = \gamma \left( \frac{\text{input}(i, y, x) - \mu}{\sqrt{\sigma^2}} \right) + \beta \quad \text{Equation 5}$$

where μ is running mean, and $\sigma^2$ is running variance. Parameters γ and β are trained parameters, and not changed in the inference phase. Thus, the BNORM layer can be fused with the previous convolution layer. In some embodiments described herein, the BNORM layer is fused with the convolution layer.

ELTWISE: ELTWISE layers merge different branching layers, which is becoming common in many CNN models. ELTWISE performs an element-wise sum operation between two merging branches, and generates the output, which is of the same dimension as the inputs.

FC: For most CNN models, the FC layer is the last layer, which is used for classification of the image. FC layers generate a 1-D result which connects all the IFMs by multiplying the IFMs with the weights and accumulating the results. In FC layers, there is no opportunity to re-utilize the weights because of which FC layers are memory intensive, and the available external (e.g., off-chip) board memory bandwidth limits their performances. Equation 6 shows the formula for calculating FC layer output:

$$\text{output}(i) = \Sigma_{n=0}^{n=Nif} w(i, n) \times \text{inp}(n) \quad \text{Equation 6}$$

where $N_i f$ is the dimension of the IFM. The AlexNet CNN model contains three FC layers as compared to ResNet-50, which has one FC layer. Embodiments described herein use the same hardware for both convolution and FC layers.

Activation: Activation functions are the non-linear functions such as tanh and sigmoid. The activation function supported by the Systolic-CNN design is a rectified linear ReLU activation function. As Equation 7 represents:

$$\text{output}(i) = (\text{input}(i) > 0)?\text{input}(i):0 \quad \text{Equation 7}$$

where ReLU generates results of same dimension as the input.

C. CNN Acceleration

High-end graphics processing units (GPUs) are popular accelerators for CNNs. However, GPUs are not a preferred choice for energy- or thermal-constrained application scenarios, such as Internet-of-things (IoT) and edge computing, as GPUs are power hungry and have limited energy efficiency. A programmable accelerator, such as an FPGA, includes configurable hardware resources whose functionality and interconnection can be redefined at runtime by programming its configuration memory.

Thanks to Moore's law and technology scaling, a state-of-the-art programmable accelerator (such as an FPGA) carries an enormous amount of fine-grained logic, computation, memory, and input/output (I/O) resources, as well as coarse-grained functional blocks, such as ARM cores, clock management modules, and high-speed serial I/Os. Upon the configuration of these resources, a programmable accelerator can implement any custom hardware architecture to accelerate any algorithm, achieving both performance and efficiency gains. State-of-the-art programmable accelerators support both dynamic and partial reconfigurations. Although at the hardware level only, these provide the foundation for sharing accelerator resources, both in time and space, among different applications, establishing the possibility for accelerator virtualization at higher levels.

Programmable accelerators, including FPGAs, have several unique features rendering them excellent accelerators for edge computing. First, unlike central processing units (CPUs) and GPUs that are optimized for the batch processing of memory data, programmable accelerators are inherently efficient for processing streaming data from I/Os. One can leverage the abundant register and configurable I/O resources to construct a streaming architecture on a programmable accelerator to process data streams from I/Os in a pipelined fashion. The pipeline registers allow efficient data movement among processing elements without involving memory access, resulting in significantly improved throughput and reduced latency.

Second, unlike CPUs/GPUs with a fixed architecture, a programmable accelerator can adapt its architecture to best fit any algorithm characteristic, taking advantage of its hardware reconfigurability. Specifically, accelerator resources can be dynamically reconfigured to compose either spatial or temporal (pipeline) parallelism or both at a fine granularity and massive scale. Spatial and temporal parallelism is critical to improving processing throughput by resolving the operation concurrency and dependency of an algorithm, respectively. As a result, programmable accelerators can provide consistently high throughput for accelerating both high-concurrency and high-dependency algorithms, which keeps the promise to efficiently serve a much broader range of IoT applications.

Third, programmable accelerators consume much lower power than CPUs/GPUs and are up to two orders of magnitude more energy-efficient, especially for streaming data processing or executing high-dependency tasks. Such merits lead to improved thermal stability as well as reduced cooling and energy costs, which is critical to edge computing considering the limited form factor of edge servers.

Embodiments disclosed herein provide Systolic-CNN: a scalable, parameterized, OpenCL-defined accelerator architecture for efficient CNN inference on programmable accelerators. The Systolic-CNN kernel has three user-defined architecture parameters that can be used to easily scale the computational parallelism, memory footprint, and memory bandwidth of the design according to a given programmable accelerator system. Therefore, the Systolic-CNN kernel is highly scalable and can always best utilize the available hardware resources for any given programmable accelerator system. Systolic-CNN is also generic enough to support a wide variety of CNN models for different computer vision tasks, such as AlexNet, ResNet-50, and ResNet-152 for image classification, and RetinaNet and Light-weight RetinaNet for object detection and video analytics.

D. OpenCL-Based Programmable Accelerator Computing

OpenCL is an open standard for the parallel programming of heterogeneous systems. OpenCL kernel language is a C++-based parallel programming language that is currently supported by a variety of computing devices, including CPUs, GPUs, DSP processors, FPGAs, etc. Traditional programmable accelerator (e.g., FPGA) design requires the use of a hardware description language (HDL), making FPGAs and other programmable accelerators out of the reach of application developers. The prevalence of high-level synthesis (HLS) technology in recent years finally makes it possible to develop programmable accelerator kernel functions in C/C++/OpenCL, making FPGAs and other programmable accelerators potential accelerators for general-purpose computing.

The OpenCL computing model consists of a host kernel and a device kernel. The host kernel, written in C/C++, runs on the host CPU, which communicates with the programmable accelerator device via peripheral component interconnect express (PCIe). The device kernel, also known as the programmable accelerator kernel, written in OpenCL, is mapped to reconfigurable hardware by first using HLS to generate HDL codes from high-level descriptions and then using conventional FPGA or other programmable accelerator tools to perform the physical implementation with static timing analysis and the binary file generation for programming the target programmable accelerator device.

The Intel FPGA SDK for OpenCL provides 1) an offline compiler that generates the kernel hardware with interface logic and builds the kernel image needed for FPGA programming; 2) a software-based emulator for symbolic debugging and functional verification; and 3) a runtime environment including an application programming interface (API) and a device driver to control and monitor the kernel deployment and execution, and transfer data between a host and an FPGA computing device. In order for an FPGA device to support the OpenCL runtime environment, a board support package (BSP) must be developed at the register-transfer level (RTL) using an HDL and implemented on an FPGA to manage and interface its on-board peripherals with the user-defined FPGA kernels. An exemplary implementation is presented using Intel OpenCL SDK for FPGA to program an Intel ARRIA 10 GX1150 FPGA, though embodiments may be implemented differently. Other examples use OpenCL to provide support for other programmable accelerators in addition to FPGAs.

Intel OpenCL offers the following two ways of programming hardware. First is NDRange programming, where the thread-level parallelism is explored. But with this, available hardware resources such as registers are not utilized efficiently, and no loops are pipelined. The performance for this mode mainly depends on the number of threads the FPGA can execute in parallel.

Second is Single-threaded Programming, where compiler pipelines loops to improve the throughput. With Single-thread programming, the compiler can map some of the buffers to the available register or shift-register that optimizes memory bandwidth utilization.

Additional features of Intel OpenCL SDK for FPGA that have been exploited in the exemplary implementation are:

Memory channels, which are the first-in-first-out (FIFO) on-chip registers that transfer the data between different kernels. This pipelines data movement and hence can be used to increase temporal parallelism.

Autorun kernels are the part of the device code that has no interface with the host code. So, they are generally used for computation, which receives data, processes it, and distributes via memory channels. Autorun kernels are always running kernels and are not invoked from the host side. This reduces the latency of invoking the kernel from the host side and hence improves the performance. Using autorun kernels also enables the compiler to optimize pipeline better and increases the frequency of the design.

II. Architecture Design

A. System Architecture

This section provides an in-depth description of the architecture design of Systolic-CNN along with the optimization techniques for different layers of CNN, namely convolution, LRN, FC, ELTWISE, and POOL to accelerate the performance of CNNs.

Figure 4:
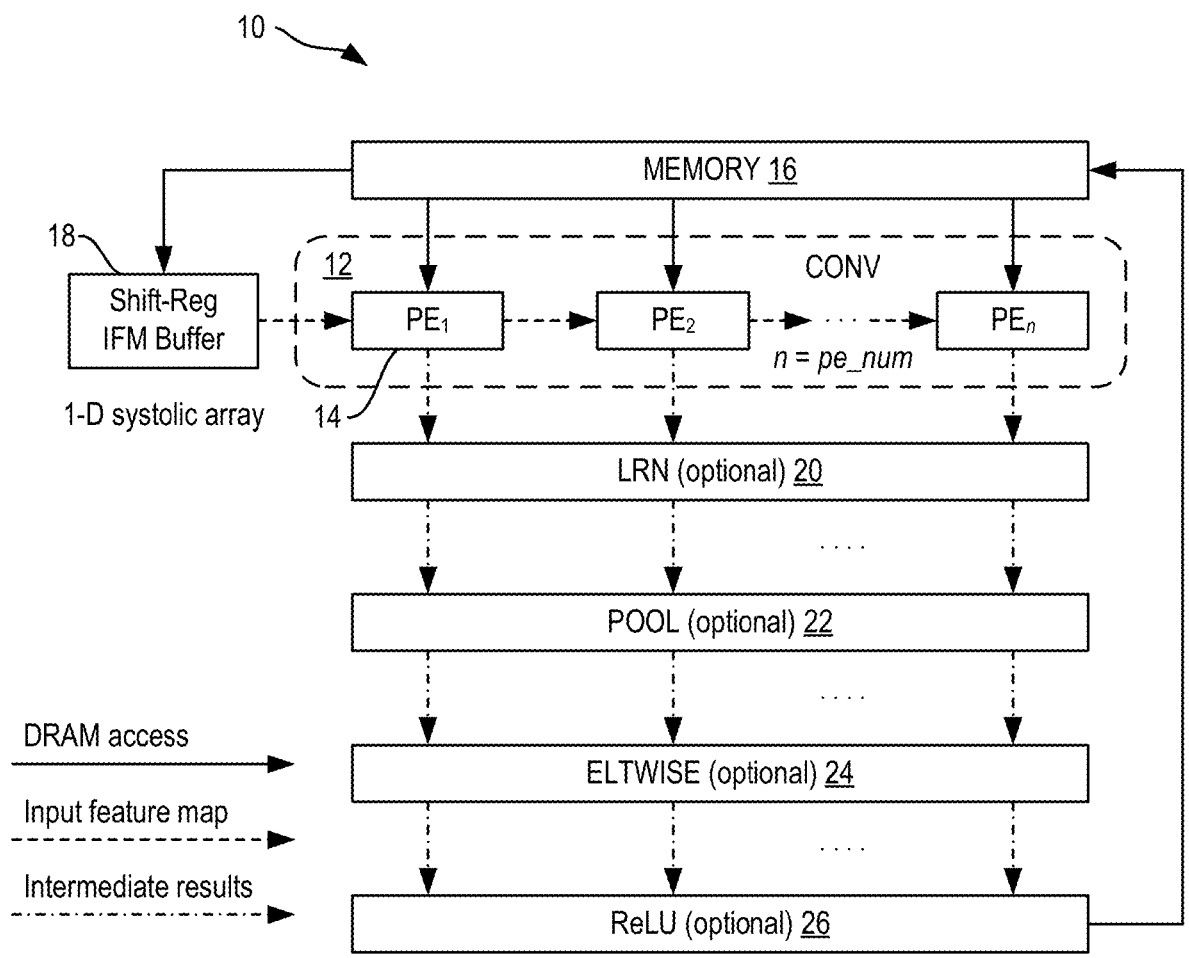
FIG. 4 is a schematic diagram of an exemplary system architecture for Systolic-CNN, a convolutional neural network (CNN) accelerator according to embodiments described herein.

FIG. 4 is a schematic diagram of an exemplary system architecture for Systolic-CNN 10, a CNN accelerator according to embodiments described herein. The convolution engine (CONV) 12 in Systolic-CNN 10 adopts a highly pipelined and paralleled 1-D systolic processing element (PE) 14 array architecture for performing high-throughput convolutions with both spatial and temporal parallelism. The IFMs are read from an off-chip memory 16 (e.g., dynamic random access memory (DRAM) or another appropriate memory) and cached in an on-chip shift register-based IFM buffer 18 for reducing off-chip memory access and maximizing the data reuse of IFMs for the convolution computation both within the same and across different output feature maps (OFMs), which is further described in Section II.F. The weights are also read from the off-chip memory 16 and cached inside the PEs 14 to be reused for the convolutional computation within the same OFMs.

Depending on the subsequent layer of convolution, the convolution results are sent to either the LRN 20, POOL 22, ELTWISE 24 or ReLU 26 modules. The LRN 20, POOL 22, ELTWISE 24, and ReLU 26 computation are optional during the kernel execution depending on the CNN model structure. The output results are loaded back to the off-chip memory 16 for either the computation of the next convolution or FC layers or return to the host kernel process. Similarly, for the following convolution layers, the IFMs are read from the off-chip memory 16 along with the new weights, and the data flows in a similar direction as the first convolution layer.

Each module of the proposed system architecture is generalized to make Systolic-CNN 10 compatible with a variety of CNN models. Taking advantage of the high generality, an embodiment of Systolic-CNN 10 is tested with four different CNN models of various sizes, including AlexNet, ResNet-50, RetinaNet, Light-weight RetinaNet. The performance of each is measured and described further below in Section V.

B. Architectural Parameters

The system architecture of Systolic-CNN 10 is parametrized with three architectural parameters, namely pe_num, vec_fac, and reuse_fac. From a system architecture perspective, pe_num defines the number of PEs 14 in the 1-D systolic array that perform temporally paralleled convolution in a deep pipeline, as shown in FIG. 4. Each PE 14 performs the convolution computation of a different OFM by sharing the same IFM data in a shifted fashion. Thus, pe_num also defines the parallelism of OFM generation.

reuse_fac defines the parallelism of the inner product (IP) units inside each PE 14 as well as how many times the same IFM data is reused by each PE 14 for the convolution computation within the same OFM. Increasing reuse_fac will improve the computational throughput without changing the amount of off-chip memory access needed for reading the IFMs, and thus relaxes the off-chip memory bandwidth requirement and improves the off-chip memory bandwidth efficiency.

vec_fac defines the single instruction multiple data (SIMD) width of the partial IP computation between the weight vector and IFM vector across vec_fac different channels inside each IP unit in each PE. Thus, vec_fac and reuse_fac also define the parallelism of IFM computation along the channel and the row dimension of the IFMs, respectively. In addition, the size of the shift-register-based IFM buffer is defined by reuse_fac×vec_fac. These three parameters allow users to efficiently perform architecture design space exploration to maximize the resource utilization of a given programmable accelerator board subject to the available off-chip memory bandwidth. An example of the design space exploration based on the Intel Arria 10 development kit is discussed in Section IV.

The convolution, defined in Equation 1, is the most computationally expensive layer, and it accounts for more than 90% of the total computations of a CNN. Thus, optimizing the convolution computations is the key to accelerate the performance of the CNNs. To illustrate the impact of the architectural parameters pe_num, vec_fac, and reuse_fac on acceleration performance, example pseudo code is provided for a standard convolutional layer and that of a convolutional layer with the three architectural parameters.

FIG. 5 illustrates an example of pseudo code for a standard convolutional layer. FIG. 6 illustrates an example of pseudo code for a convolutional layer with the three architectural parameters implemented. From an algorithmic perspective, pe_num, vec_fac, and reuse_fac can be interpreted as the unrolling factor of the for loop along the depth of OFM (op_dim), the depth (channel dimension) of the IFM (ic_dim), and the row dimension of the IFM (row_dim), respectively. It should be noted that the system architecture of Systolic-CNN only depends on the three architectural parameters that are completely invariant to CNN models. Such an invariance is the key to enabling the runtime-flexibility needed for handling the dynamic workload in a multi-tenancy cloud/edge computing environment.

C. Data Loading Scheme

Figure 7:
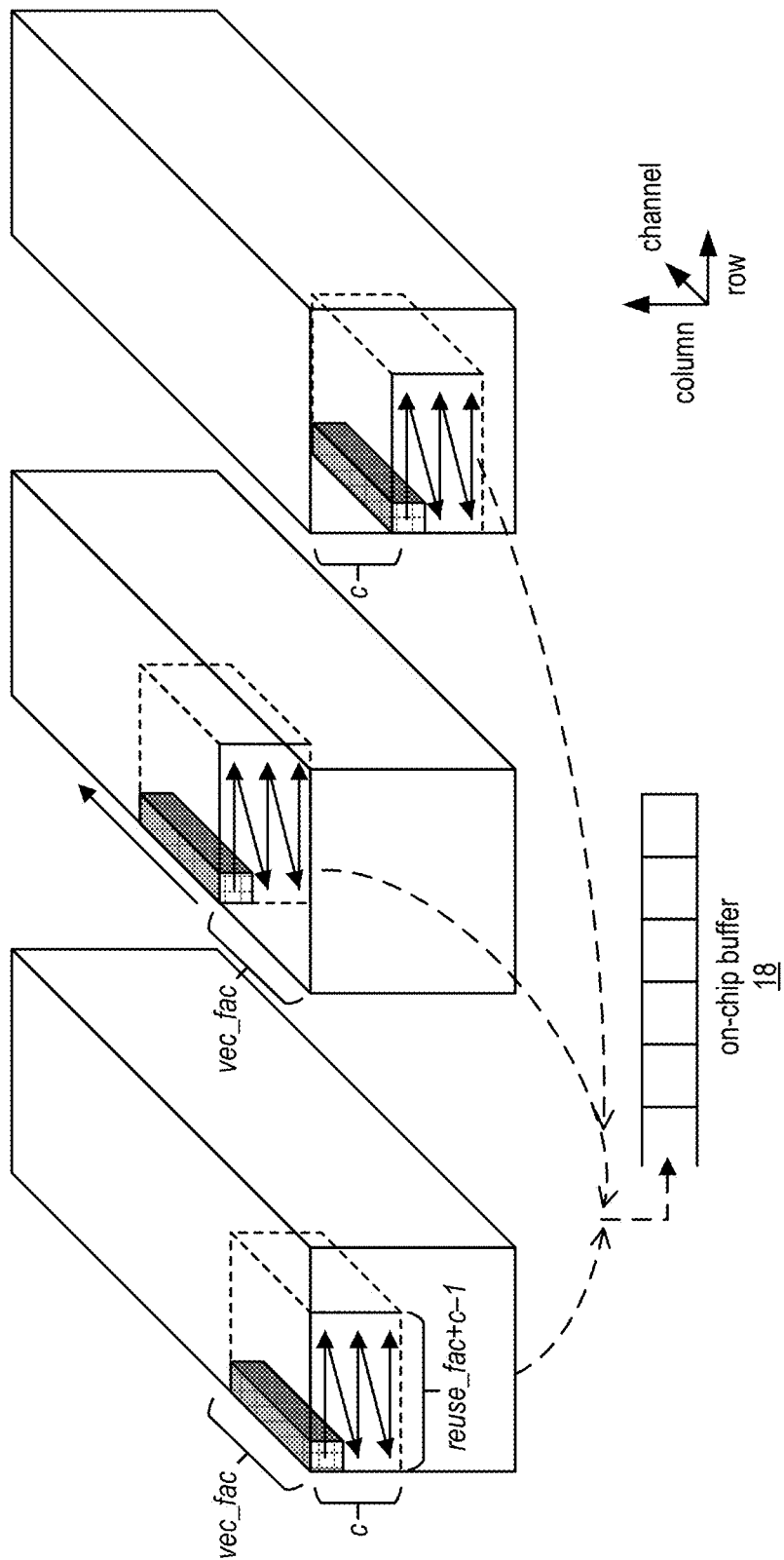
FIG. 7 is a schematic diagram of an exemplary data loading scheme of an input feature map (IFM).

FIG. 7 is a schematic diagram of an exemplary data loading scheme of the IFM. In one clock cycle, 1×1×vec_fac IFM values are loaded onto the shift-register-based IFM buffer 18. Then, the loading window slides along the row dimension reuse_fac+c−1 times and slides along the column dimension c times, where c represents the kernel size of a convolution kernel. Thus the IFM values can be reused reuse_fac times computing with the c×c convolution kernel. After the buffered IFM values have done all the computations with different weights, the loading window slides over the channel dimension to repeat the operations stated above.

D. PE Design

Figure 8:
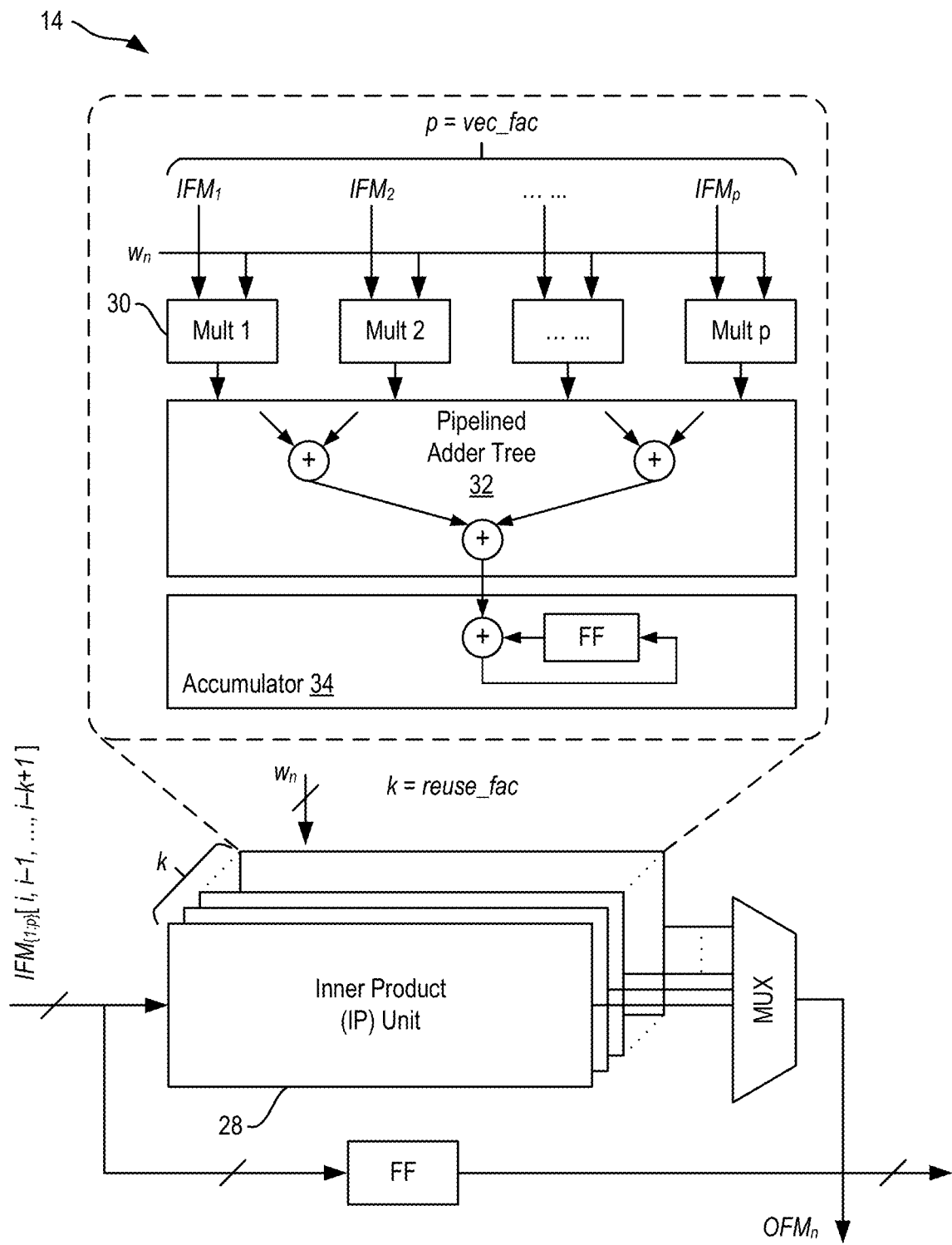
FIG. 8 is a schematic diagram of an exemplary design of an nth processing element (PE) in a convolution engine of the Systolic-CNN architecture of FIG. 4.

FIG. 8 is a schematic diagram of an exemplary design of an nth PE 14 in the convolution engine of the Systolic-CNN architecture of FIG. 4. Each PE 14 contains multiple IP units 28 (defined by reuse_fac), each of which computes the 3-D inner product across different sliding windows of the convolution computation within the same OFM. Different IP units 28 share the same set of weights and take in the same IFM vector sequence in a shifted fashion to reuse the IFM data by a factor of reuse_fac times. Each IP unit 28 contains multiple multipliers 30 and a pipelined adder tree 32 for computing partial IPs with a SIMD width defined by vec_fac as well as an accumulator 34 for computing the IP of an arbitrary dimension in a folded, pipelined fashion to eliminate the need of data movement for partial IP summation. To facilitate the IFM data movement throughout the 1-D systolic array of PEs, each PE 14 also shifts the input IFM data directly to the subsequent PE 14 with a one cycle latency.

It should be noted that when performing the computation in fully connected layers, the weight sharing across different IP units 28 in the PE 14 becomes inefficient and causes low utilization of the computation resources. To address this problem, Systolic-CNN supports a batch processing mode for fully connected layer computation. By processing multiple input images in a batch mode, the same weights in the fully connected layer can be again shared across different IP units 28 for performing the computation of different images. The batch size must be ≤reuse_fac. When the batch size=reuse_fac, the computation resources in each PE 14 can be fully utilized for accelerating the computation in fully connected layers.

The convolution computation performed in each PE 14 exploits two levels of spatial parallelism: the parallelism of IP units defined by reuse_fac and the parallelism of partial IP computation defined by vec_fac. Given the 1-D systolic PE array also exploits a temporal/pipelined parallelism of pe_num, the overall parallelism of convolution computation employed in Systolic-CNN is vec_fac×reuse_fac×pe_num.

Based upon the understanding of the PE architecture, one should note that, while increasing any of the three architectural parameters keeps the promise to improve the computation parallelism and the computational throughput proportionally, their impact on the required off-chip memory bandwidth is slightly different. Increasing vec_fac increases the amount of IFM data accessed in each clock cycle, and thus has a large impact on the required off-chip memory bandwidth. Increasing pe_num increases the amount of weight data access required only at the beginning of each convolution computation or in each clock cycle in the case of fully connected layer computation. Thus, pe_num has a very large impact on the required off-chip memory bandwidth during the computation of fully connected layers. Differently, increasing reuse_fac will only change IFM data access pattern without affecting the amount of IFM data accessed in each clock cycle, and thus has no impact on the required off-chip memory bandwidth.

The advantages of the 1-D systolic PE array architecture include 1) limiting the fan-out at the local IFM buffer interface; 2) assuring short and local interconnects used in the programmable accelerator implementation; 3) reducing the amount of off-chip and on-chip memory access needed by reusing and moving IFM data through shift registers. These benefits are the key to improving the scalability of Systolic-CNN, the system operating frequency, and the off-chip memory bandwidth efficiency, which are all essential to the system-level performance of CNN acceleration on a programmable accelerator computing device. Compared with 2-D systolic array-based CNN accelerator architectures, the 1-D systolic PE array architecture of Systolic-CNN has much simplified memory control, data organization, and local buffering schemes for handling IFM and weight data.

E. OpenCL Kernel Design

The Intel OpenCL SDK for FPGA is used to implement an exemplary embodiment of Systolic-CNN. Along with the convolution, other layers, namely LRN, POOL (e.g., max pooling), RELU, and ELTWISE, are separated into different kernels. For some layers, namely FC and average pooling, the same convolution kernel is reused to increase the hardware efficiency.

1. Convolution Kernel Design

The OpenCL kernel design consists of multiple kernels that communicate through the Intel's OpenCL memory channels (discussed in Section I.D) to implement the proposed 1-D systolic array architecture for the convolution. To allow Intel FPGA SDK for OpenCL to better resolve the data-dependency and create the deep processing pipeline properly, the programmable accelerator kernels of an exemplary embodiment of Systolic-CNN are all implemented as single-threaded kernels. Specifically, the shift-register-based IFM buffer is implemented as a MemRead kernel. In addition, each PE is implemented as an auto-run kernel to minimize the host-induced latency during CNN inference, the LRN and POOL modules are each implemented as a separate kernel, and the ELTWISE and ReLU modules are combined and implemented as a MemWrite kernel, as described further below with reference to FIG. 9.

Given that convolution is the bottleneck of computation in CNNs, the PE (convolution) kernels are designed to utilize most of the coarse-grained computation resources on a programmable accelerator, while the other computation kernels are designed to utilize the minimum resources needed for making sure they are not the computational throughput bottleneck. In addition, the PE (convolution) kernels are optimized with a minimum initiation interval of 1 cycle. Systolic-CNN can support any customized residual neural networks with skipped connections.

Figure 9:
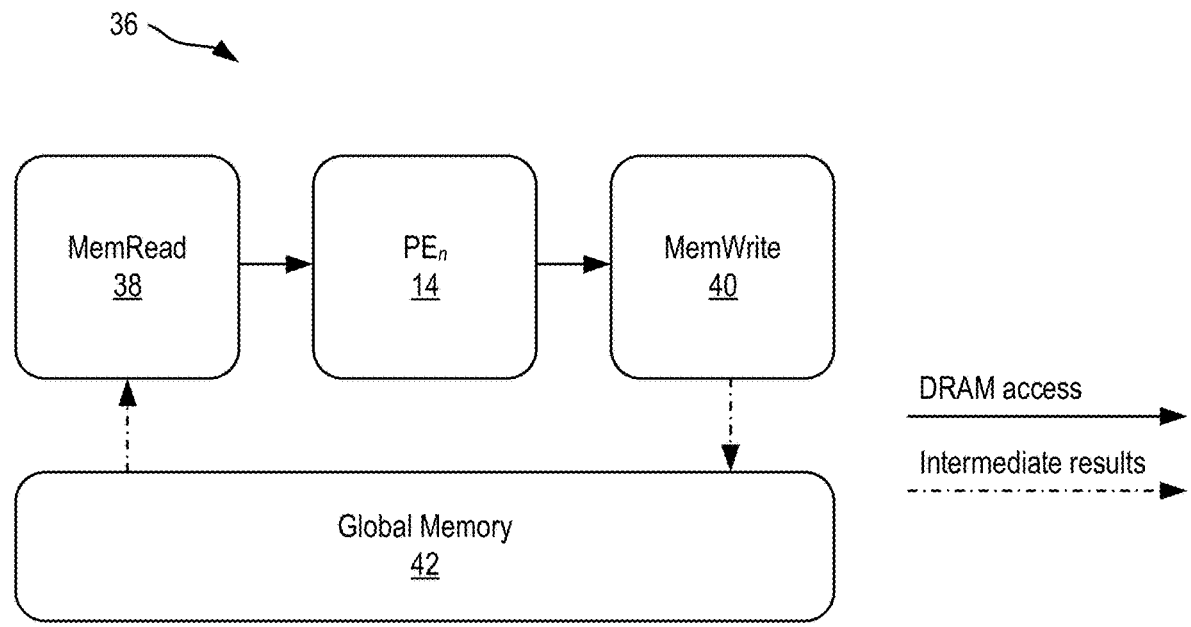
FIG. 9 is a schematic diagram of an exemplary convolutional kernel design for embodiments of Systolic-CNN using one PE kernel for computation.

FIG. 9 is a schematic diagram of an exemplary convolutional kernel 36 design for embodiments of Systolic-CNN using one PE 14 kernel for computation. Two single-threaded kernels, namely, MemRead 38 and MemWrite 40, are responsible for transferring the data from and to the external memory 42, respectively. The Mem Read kernel 38 loads the IFMs and the weights and shifts them to the PE 14 kernel through memory channels. The shift-register-based on-chip IFM buffer is implemented in the Mem Read kernel 38 to store the IFMs. The PE 14 kernel is an autorun kernel (discussed in Section I.D), which receives the data, performs MAC operations, and streams out the result to the Mem-Write kernel 40, where the results are transferred back to the external memory 42. pe_num parameter defines the size of the PE kernel array, which sends out the results to the MemWrite kernel 40 in parallel.

The key advantages of adopting this kernel architecture are:

Deep pipelined processing: Multiple kernels communicating with each other through memory channels increases the level of temporal (pipeline) parallelism.

Optimal initiation interval (one cycle): Separating the convolution operation into multiple cascaded kernels allows the Intel FPGA OpenCL SDK compiler to resolve all the serial dependencies that exist in the design. As a result, the compiler efficiently pipelines the design with an initiation interval of one clock cycle.

High utilization of the hardware resources: Other layers, namely POOL, ELTWISE, and RELU, also use Mem Read and MemWrite kernels, thus increasing the efficiency of hardware resources utilization.

The first two advantages of this kernel architecture are the key to improving the throughput of the Systolic-CNN accelerator.

2. LRN Kernel Design

The LRN layer normalizes the IFMs and is defined by Equation 2. Out of all the CNN models that are used for evaluation of Systolic-CNN, only AlexNet uses this layer. LRN layers require an exponential function, which consumes a large amount of accelerator resources. This limits the resource utilization of the convolution layer, which is more crucial to accelerate the performance. To reduce the additional utilization of the resources, exponential operation is implemented using a piece-wise linear approximation function. LRN could also be reformulated as Equation 8, where f(x) represents the exponential term of Equation 2:

$$\text{out}(x) = \text{in}(x) * f(x) \qquad \text{Equation 8}$$

To achieve the required accuracy, fifty points are defined for the piece-wise linear approximation of the exponential function. The LRN kernel is implemented in a single-threaded OpenCL kernel mode, with vec_fac determining the SIMD width for the LRN layer. The number of outputs generated in parallel is equal to the vec_fac parameter.

3. POOL Kernel Design

Average and max pooling are the two types of pooling supported by the design. For max pooling, defined by Equation 4, a single-threaded kernel is added that receives the IFMs from a Mem Read kernel through the memory channel and performs a comparison to find the maximum value and write back the result to the external memory. The vec_fac parameter determines the SIMD width for max pooling.

For average pooling, defined by Equation 3, where $K_p \times K_p$ is the pooling filter size, Systolic-CNN uses the same kernel design as the convolution kernel. The average pooling output is generated by accumulating the IFMs and multiplying the accumulated result with $$\frac{1}{K_p \times K_p}.$$

So, by defining the weights as $$\frac{1}{K_p \times K_p}$$

and using the distributive property of addition and multiplication, embodiments are able to use the convolution kernels for average pooling, which further increases the hardware utilization.

4. FC Kernel Design

The FC layer flattens the IFM to one dimension and is a special case of the convolution with the filter size being the IFM dimension. With loop3, loop4, and loop5 removed, the C code of the convolution in FIG. 5 can be used for describing the computations in the FC layer. Therefore, the convolution kernel is reused to support the computations in the FC layer. Since the FC layer is a memory bounded layer (discussed in Section I.C) and requires fewer computations as compared to the convolution layer, the performance of the FC layer is limited by the available external memory bandwidth of the programmable accelerator board. The two solutions that the Systolic-CNN design supports to reduce the impact of the limited board memory bandwidth are: 1) quantization of the FC layer weights to reduce memory bandwidth requirement, and 2) batch-processing multiple images when the FC layers start in parallel, which increases the reusability of weights to improve the throughput of the design.

5. Other Layers Kernel Design

Other layers, namely ELTWISE and RELU, are implemented in the MemWrite kernel of FIG. 9. The RELU and ELTWISE layers are implemented as optional functional units and are only activated when needed.

F. Optimization for Memory Access

Loop tiling is an optimization technique that is adopted to reduce the amount and frequency of the external memory access, thus relaxing the external memory bandwidth requirements and improving the performance of embodiments of Systolic-CNN. Loop tiling optimizes the utilization of the on-chip memory by storing a block of input data onto the on-chip memory and reusing the block of data stored locally as cached data. Since shift-register-based buffers are the most efficient buffering scheme for pipelined processing in a systolic array architecture, it is implemented as the buffering scheme in embodiments of Systolic-CNN for storing the block of IFMs. One should note that the Intel FPGA OpenCL SDK compiler only synthesizes shift-register-based buffers efficiently in single-threaded kernel mode. Therefore, the MemRead kernel is implemented in the single-threaded kernel mode in an exemplary embodiment of Systolic-CNN.

Figure 10:
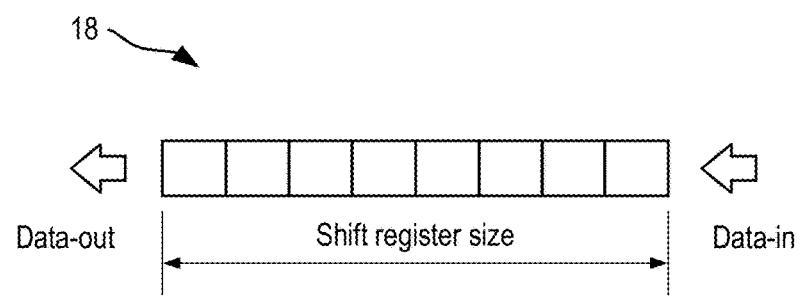
FIG. 10 is a schematic diagram of a shift-register-based IFM buffer for embodiments of Systolic-CNN.

FIG. 10 is a schematic diagram of a shift-register-based IFM buffer 18 for embodiments of Systolic-CNN. With shift-register-based buffer implementation, all the elements are reused until they are pushed out of the IFM buffer (e.g., data is available for 8 cycles and can be reused for 8 cycles). The shift-register-based buffering scheme eliminates the need for using wide multiplexers to feed the data into PEs and significantly simplifies the interconnections between the memory buffers. This reduces the critical path delay and hence increases the frequency of the Systolic-CNN accelerator. The size of the IFM buffer is determined by the reuse_fac and vec_fac and is given by Equation 9:

$$SR\_size = reuse\_fac \; vec\_fac \qquad \text{Equation 9}$$

with the step size of shifting per clock cycle equaling to vec_fac bits. The shift-register-based IFM buffer decreases the overall external memory access by the factor indicated by Equation 9, thus improving the memory bandwidth efficiency and the overall system-level performance of embodiments of Systolic-CNN.

G. Reading of IFM

The IFMs can be considered as 3-D data, and the vec_fac parameter determines the size of the IFMs transferred from the external memory per cycle. The objective of the Systolic-CNN design is to minimize the number of output results generated by each PE to reduce the size of the output multiplexer, which collects the output results and transfers them to the external memory. The reading of the IFMs whether along the channels or the rows results in a different number of outputs generated in parallel. Thus, optimizing the reading of the IFMs becomes vital to reducing the size of the output multiplexer.

Figure 11A:
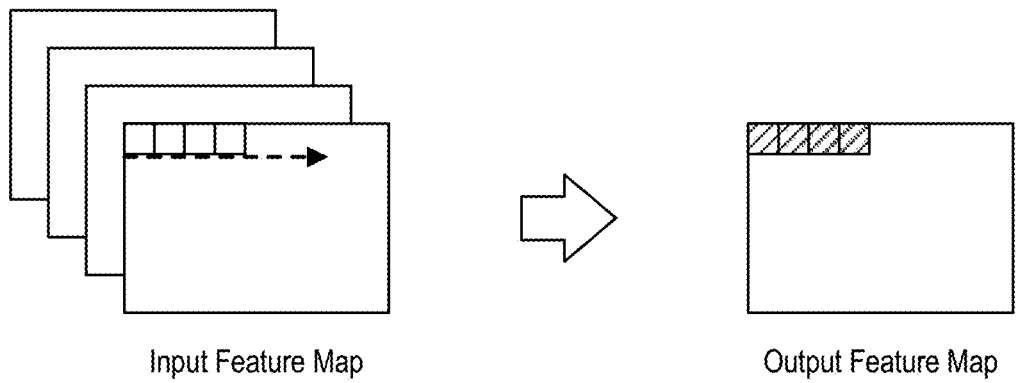
FIG. 11A is a schematic diagram illustrating a first exemplary process of reading IFMs for embodiments of Systolic-CNN.
Figure 11B:
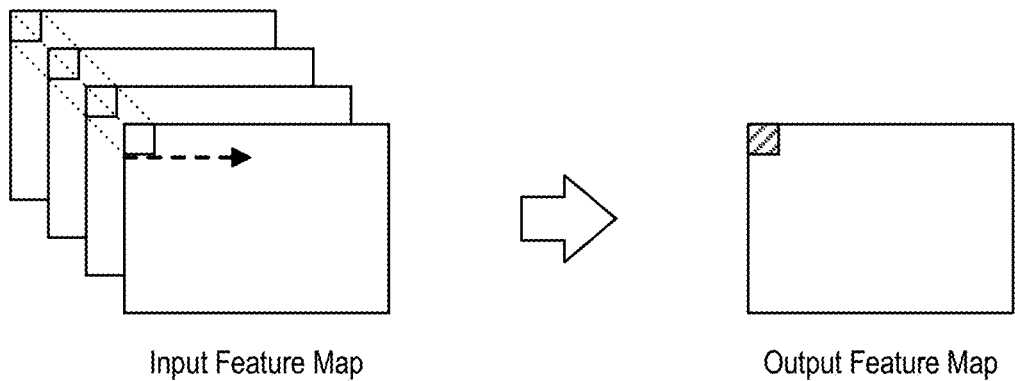
FIG. 11B is a schematic diagram illustrating a second exemplary process of reading IFMs for embodiments of Systolic-CNN.

FIG. 11A is a schematic diagram illustrating a first exemplary process of reading IFMs for embodiments of Systolic-CNN. FIG. 11B is a schematic diagram illustrating a second exemplary process of reading IFMs for embodiments of Systolic-CNN. Memory accesses are coalesced to increase the efficiency of available memory bandwidth. In each clock cycle, a vector of IFM data in the size of vec_fac is read in parallel from the external memory. With vec_fac defining the amount of data transferred from the external memory per clock cycle, there are two possible ways of reading an IFM vector in parallel:

Reading along the row in parallel: Reading vec_fac size of data along the row of the IFMs per cycle, as shown in FIG. 11A, results in paralleling the loop in line 4 of FIG. 6 to increase parallel computations, thus generating the output size of vec_fac per PE.

Reading along the channel in parallel: Reading vec_fac size of data along the channels of IFMs, as shown in FIG. 11B, results in paralleling the loop in line 2 of FIG. 6 to increase parallel computations, and thus generating the output size of one per PE.

Comparing the two reading patterns, reading the IFMs along the channels generates outputs, which are $$\frac{1}{vec\_fac}$$

times fewer outputs as compared to reading along the row. Thus, to reduce the size of the output multiplexer in embodiments of Systolic-CNN, a vector of IFM data is read along the channel in parallel per clock cycle. The size of the output multiplexer depends on the pe_num and vec_fac parameters.

To enable reuse of the loaded IFM vectors for the convolution computation within the same OFM, different IFM vectors are first read along the convolution window within the same OFM and then along the folded channel at different clock cycles. Specifically, the different IFM vectors within the 1st reuse_fac number of convolution windows across the 1st vec_fac number of channels are first read sequentially across different clock cycles. Then, the different IFM vectors within the 1st reuse_fac number of convolution windows across the 2nd vec_fac number of channels are read sequentially across different clock cycles. After all the IFM vectors within the 1st reuse_fac number of convolution windows of all the channels are read, the IFM vectors within next reuse_fac number of convolution windows will be read in the same fashion.

H. Design for Scalability

The proposed 1-D systolic array architecture in Section II.D reduces routing congestion and removes the input multiplexer from the design, which increases the scalability of the design. However, as the design scales up, fan-in of the storage units and fan-out of the load unit issues become the bottleneck that prevents the further upscaling up of the design.

The high fan-in issue exists in the storage unit that collects the output, which it receives from multiple PEs in the MemWrite kernel of FIG. 9. To resolve this issue, the solution discussed in Section II.F is proposed to read the IFMs along the channels to minimize the size of the output multiplexer and hence reduce fan-in of the storage unit.

The high fan-out issue exists in the load units that are used to transfer the IFMs and the weights from the external memory to the on-chip IFM buffer. The full utilization of resources is not possible because the high fan-out of load units creates a routing congestion problem as the parallelism of computation increases. That is why resolving fan-out issues in the design is critical, enabling the design to scale up.

For the Systolic-CNN design, the high fan-out issue exists in the IFMs and weights load units, which stream the data to the pe_num number of PEs through memory channels. The proposed 1-D systolic array convolution architecture shifts the IFMs from one PE to another PE. Thus, it resolves the fan-out issue for the IFM load unit. However, the fan-out of the weight load units driving pe_num PEs increases proportionally as the number of PE. For resolving the high fan-out of the weight load unit, the proposed solution generates multiple load units to transfer the weights from the external memory to the on-chip IFM buffer.

By replacing the one large load unit with four load units, each with a fan-out factor of four, embodiments are able to resolve the routing congestion problem of the tool as well as improve the operating frequency of the Systolic-CNN design by 1.1 times. This enables embodiments of Systolic-CNN to scale up to increase the utilization of DSP blocks.

The maximum bit width of the data port is determined such that a load unit can be supported without having routing congestion issues. Equation 10 determines the number of load units for Arria 10 GX115 FPGA, where 2048-bit is found to be the maximum bit width suitable for one load unit, regardless of whether the data type is single-precision floating number or fixed-point representation:

$$Numberofloadunits = (vec\_size \times pe\_num \times bitsizeof datatype)\%2048 \quad \text{Equation 10}$$

The automated generation of the load units enables embodiments to scale up the design freely and easily achieve 100% utilization of the DSP resources on a programmable accelerator.

I. Host Kernel Design

While the FPGA kernels of Systolic-CNN are invariant to CNN models, a host kernel must be customized for deploying different CNN models onto the Systolic-CNN implementation on an OpenCL-supported FPGA computing device. The host kernel should invoke the corresponding computation kernel in Systolic-CNN just once for mapping each layer of a CNN model depending on the CNN model structure. The CNN model parameters (filter sizes, stride, padding information, etc.) are sent from the host kernel program to the FPGA kernels at runtime to control the operations of each of the invoked FPGA kernel. The runtime flexibility of Systolic-CNN allows edge users to deploy a wide range of CNN models for acceleration without the need to change or recompile the FPGA kernel codes nor reprogramming the FPGAs. This is the key to enabling the acceleration-as-a-service for CNN inference in multi-tenancy cloud/edge computing.

III. Evaluation Setup

Two different setups are used to conduct evaluations for edge and cloud computing scenarios. Evaluations to reflect edge computing user cases are conducted based on an Intel Arria 10 GX FPGA Development board.

Figure 12:
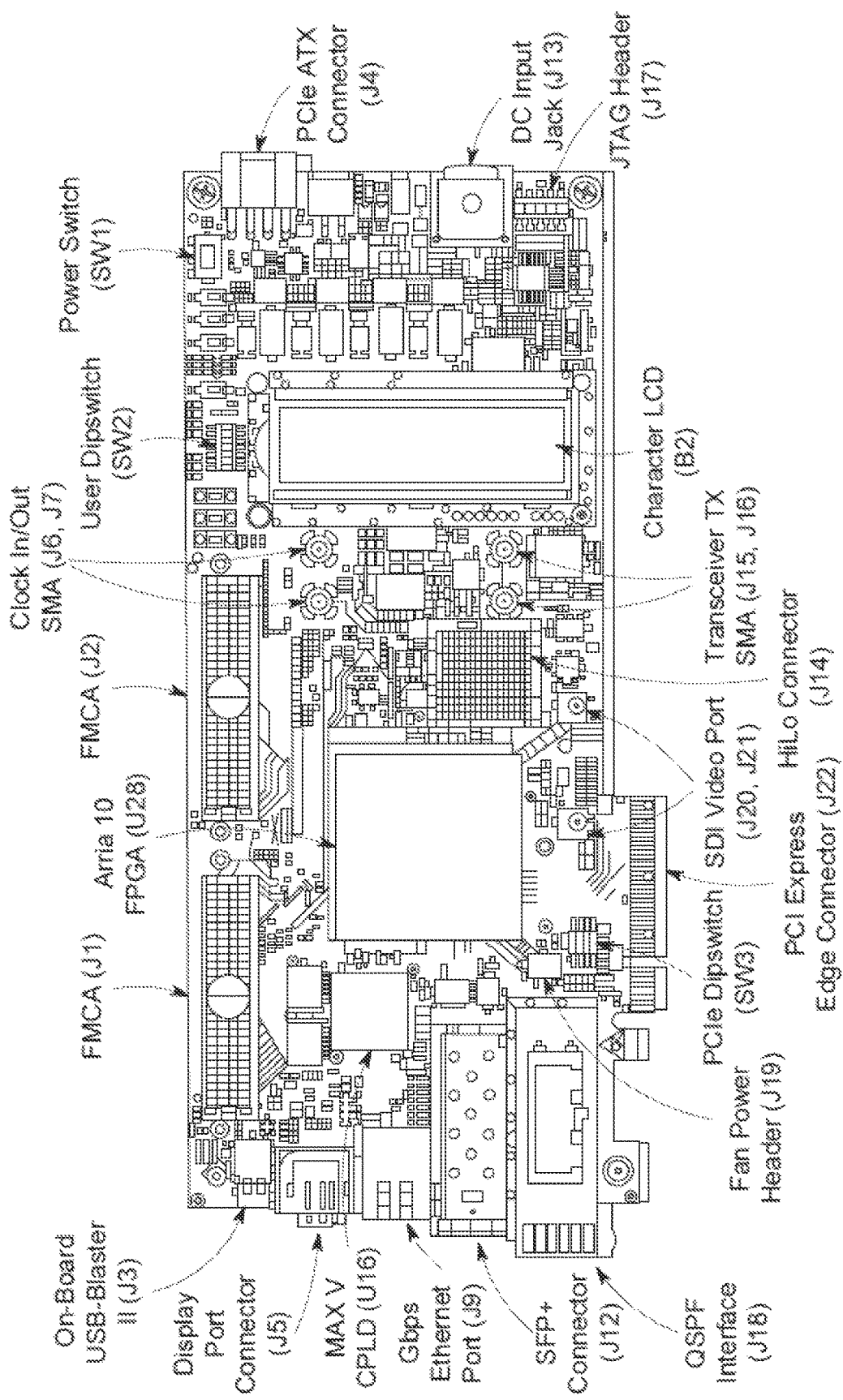
FIG. 12 is a photo diagram illustrating an exemplary Intel Arria® 10 GX field-programmable gate array (FPGA) Development Board used for evaluations.

FIG. 12 is a photo diagram illustrating an exemplary Intel Arria® 10 GX FPGA Development Board used to run evaluations. This FPGA has 1518 hardened floating-point DSP blocks that perform computation. The FPGA board has an external 2 gigabytes (GB) of DDR4 memory, with the memory bandwidth of 19.2 GB per second (GB/s). Intel FPGA SDK for OpenCL version 18.0 is used to compile device code. Host code is written in C/C++ and device code in OpenCL.

Evaluations to reflect cloud computing user cases are conducted based on a BittWare 520N FPGA accelerator card that is equipped with a Stratix 10 GX2800 FPGA and 32GB DDR4 SDRAM with a maximum memory bandwidth of 2400 MT/s. Intel FPGA SDK for OpenCL version Pro 19.4 is used for kernel compilation and deployment.

After mapping design, the performance of multiple CNN models (AlexNet, ResNet-50, RetinaNet, and Light-weight RetinaNet) is presented in Section V to demonstrate the flexibility of the Systolic-CNN design. OpenCL is used to pre-process images before it is sent to the FPGA. A 32-bit floating-point and fixed-point representation are used for weights, IFMs, and output feature maps. For fixed-point representation, the performance is measured for the 8-bit data type of both the weight and IFMs. The architecture parameters are used to explore the available FPGA resources, and the impact of parameters in scaling up the design is discussed in Section IV.

IV. Design Space Exploration

A key target of Systolic-CNN is to efficiently utilize the available DSP blocks of a given programmable accelerator to maximize the parallel computations that would enable embodiments of Systolic-CNN to achieve maximum performance. The three architectural parameters defined for the accelerator, namely pe_num, reuse_fac, and vec_fac, are explored to scale up the DSP blocks utilization.

The scaling up of the architectural parameters increases the size of the IFM buffer (Equation 9) and the weights buffer (Equation 11), which increases the utilization of the on-chip memory blocks and the demand of the external board memory bandwidth:

$$\text{weightsbuffersize} = \text{pe\_num} \times \text{vec\_size} \quad \text{Equation 11}$$

Equation 10 is used to determine the number of load units synthesized for transferring the weights from the external memory to the on-chip buffer. Architecture parameters reduce the external memory accesses for both the weights and IFMs. The total reduction in the external memory accesses is given by Equation 12:

$$\text{Reductioninexternalmemoryaccess} = 2 \times \text{pe\_num} \times \text{vec\_fac} \times \text{reuse\_fac} \quad \text{Equation 12}$$

Each architecture parameter has a different impact on the increase in the demand for the external board memory bandwidth, on-chip memory blocks utilization, and DSP blocks utilization. Thus, different combinations of the architectural parameters are explored to maximize the DSP blocks utilization such that on-chip memory blocks utilization and the external board memory bandwidth is not the limiting factor in the scaling up of embodiments of Systolic-CNN.

The evaluations are performed on the Intel Arria 10 GX1150 FPGA with the available DSP and on-chip memory blocks, given in Table 1. The performance of the AlexNet CNN model is measured to explore the values of the architectural parameters.

TABLE 1

Available FPGA Resources

| Resources | Available Units |
|---|---|
| Logic Elements(k) | 427,200 |
| On-chip Memory Blocks | 2,713 |
| DSP Blocks | 1,518 | vec_fac determines the parallelism of IFM data access from the off-chip memory to the shift-register-based IFM buffer per clock cycle, and thus has a large impact on the off-chip memory bandwidth. As a result, the value of vec_fac should depend on the per-cycle burst width of data access allowed by the off-chip memory and the bit width of the IFM. Specifically, the optimal value of vec_fac is determined by Equation 13:

$$\text{vec\_fac} = \frac{burstWidth}{bitWidth} \quad \text{Equation 13}$$

Given the value of vec_fac determined by Equation 13, there will be no memory stalling even if the off-chip memory access of IFM data happens every clock cycle (assuming the convolution kernels operate with a minimum initiation interval of 1 cycle), which guarantees a high off-chip memory bandwidth efficiency. Since the burst width of data access allowed by the off-chip memory on the Intel Arria 10 GX FPGA Development board is 512 bits and the bit width of IFM data is 32 bits based on a single-precision floating-point data format, the value of vec_fac is set to 16 for evaluation embodiments of Systolic-CNN.

pe_num determines the parallelism of weight data access from the off-chip memory per clock cycle for fully connected layer computation, and thus has a large impact on the off-chip memory bandwidth during the computation of fully connected layers only. To determine the optimized value of pe_num, the run time of the most memory intensive layers of the AlexNet CNN model, that is first two FC layers (FC6 and FC7), are measured with different pe_num.

Figure 13:
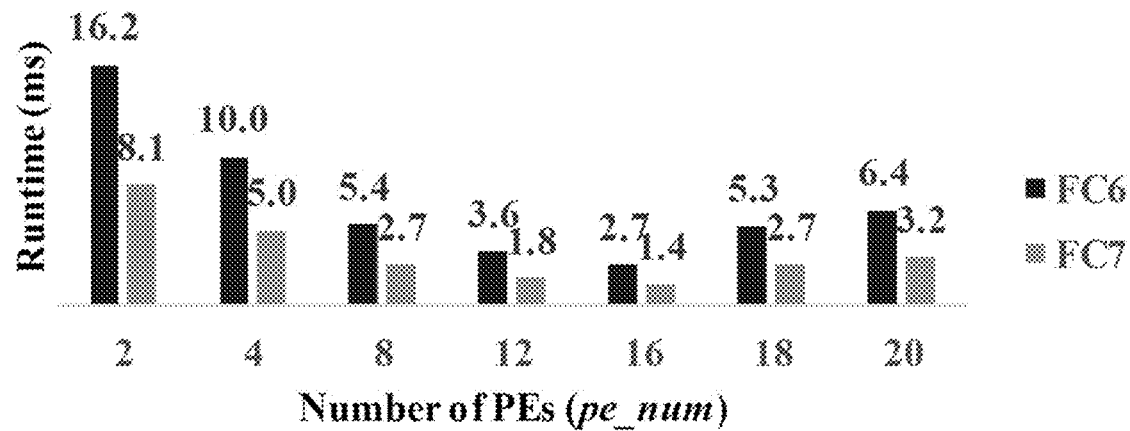
FIG. 13 is a graphical representation of runtime of sixth fully-connected (FC6) and seventh fully-connected (FC7) layers in the AlexNet CNN model as a function of a pe_num parameter.

FIG. 13 is a graphical representation of runtime of the FC6 and FC7 layers in the AlexNet CNN model as a function of the pe_num parameter. In this figure pe_num is swept from 2 to 20 with a step size of 2, while vec_fac is fixed to the optimized value of 16 and reuse_fac is set to 1. The runtime of FC6 and FC7 layers reaches the minimum at the pe_num value of 16. The increase in runtime beyond the pe_num value of 16 indicates that those cases are already memory-bounded, which are limited by the available off-chip memory bandwidth. Therefore, the optimal value of pe_num is determined to be 16.

reuse_fac determines the parallelism of IP units inside each PE for reusing the IFM data as well as the size of the shift-register-based IFM buffer (Equation 9). Since reuse_fac has no impact on the off-chip memory bandwidth requirement, the scaling of reuse_fac is not limited by the off-chip memory characteristics but only depends on the available DSP resources on an FPGA.

Figure 14:
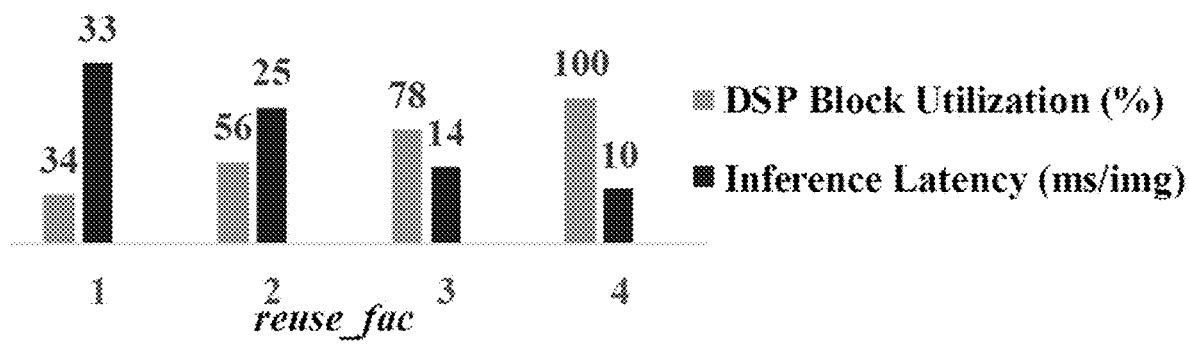
FIG. 14 is a graphical representation of inference latency of accelerating the AlexNet CNN model and digital signal processing (DSP) block utilization as a function of a reuse_fac parameter.

FIG. 14 is a graphical representation of the inference latency of accelerating the AlexNet CNN model and the DSP block utilization as a function of the reuse_fac parameter. In this figure, reuse_fac is swept from 1 to 4 while pe_num and vec_fac are both fixed to their optimized value of 16. It is shown that the DSP utilization increases, while the runtime decreases, in a linear fashion as reuse_fac increases. In addition, the DSP utilization reaches 100% and the minimum runtime is achieved at the reuse_fac value of 4. The result shown in FIG. 14 is evidence of the great scalability of Systolic-CNN.

After determining the optimized values of the three architecture parameters, the Systolic-CNN accelerator utilizes 100% of the available computing resources on an Intel Arria 10 GX1150 FPGA with architecture parameters values shown in Table 2.

TABLE 2

| pe_num | reuse_fac | vec_fac |
|---|---|---|
| \multicolumn{3}{c}{Parameters Value} | | |
| 16 | 4 | 16 |

V. Results

This section presents the performance of the CNN models. In particular, the inference latency of the optimized Systolic-CNN accelerator is measured on an Intel Arria 10 GX FPGA Development board for running five different CNN models: AlexNet, ResNet-50, ResNet-152, RetinaNet, and Light-weight RetinaNet (described in Section I.A above). As Systolic-CNN is runtime-flexible, only the host kernel is updated for deploying different CNN models in the evaluations without recompiling nor redeploying the FPGA kernel. By default, Systolic-CNN adopts the single-precision floating-point data format for the sake of runtime flexibility.

To see the impact of reduced numerical precision on inference latency, an optimized Systolic-CNN accelerator is also implemented with an 8-bit fixed-point data format by using the arbitrary-precision data type supported by Intel FPGA SDK for OpenCL. In this case, the design scalability is no longer bounded by the off-chip memory bandwidth due to a 4× reduction of the bit-width of both IFMs and weights but limited by the available RAM block resources. The optimal values of the architectural parameters for 8-bit fixed-point implementation are found to be pe_num=36, reuse_fac=8, and vec_fac=16.

The purpose of the comparison with state-of-the-art is not to show any performance benefits of Systolic-CNN, but rather, it is to show the runtime flexibility and scalability advantages with the comparable performance given the differences in data format, numerical precision, and computational methods used in different designs.

Table 3 shows a comparison of the performance of embodiments of Systolic-CNN with state-of-the-art OpenCL-based accelerator performances for running AlexNet CNN based on the ImageNet dataset (as described in J. Deng, W. Dong, R. Socher, L.-J. Li, K. Li, and L. Fei-Fei, "Imagenet: A large-scale hierarchical image database," in 2009 *IEEE conference on computer vision and pattern recognition*, pp. 248-255, 2009) with an input image size of 227×227×3. These OpenCL-based CNN accelerators are referred to as Aydonat (described in U. Aydonat, S. O'Connell, D. Capalija, A. C. Ling, and G. R. Chiu, "An OpenCL Deep Learning Accelerator on Arria 10," in *Proceedings of the* 2017 *ACM/SIGDA International Symposium on Field-Programmable Gate Arrays*, pp. 55-64. ACM, 2017), Wei (described in Xuechao Wei, Cody Hao Yu, Peng Zhang, Youxiang Chen, Yuxin Wang, Han Hu, Yun Liang, and Jason Cong, "Automated Systolic Array Architecture Synthesis for High Throughput CNN Inference on FPGAs," in *Proceedings of the 54th Annual Design Automation Conference* 2017, p. 29, ACM, 2017), Wang (described in Dong Wang, Ke Xu, and Diankun Jiang, "PipeCNN: An OpenCL-Based Open-Source FPGA Accelerator for Convolution Neural Networks," in 2017 *International Conference on Field Programmable Technology (ICFPT)*, pp. 279-282, IEEE, 2017), and Suda (Naveen Suda, Vikas Chandra, Ganesh Dasika, Abinash Mohanty, Yufei Ma, Sarma Vrudhula, Jae-sun Seo, and Yu Cao, "Throughput-Optimized OpenCL-Based FPGA Accelerator for Large-Scale Convolutional Neural Networks," in *Proceedings of the* 2016 *ACM/SIGDA International Symposium on Field-Programmable Gate Arrays*, pp. 16-25, ACM, 2016).

TABLE 3

Comparison with Existing Accelerators (Batch Size = 1)

| Work | Aydonat | Wei | Wang | Suda | Systolic-CNN | |
|---|---|---|---|---|---|---|
| FPGA | Arria 10 GT1150 | Arria 10 GT1150 | Arria 10 GX1150 | Stratix-V GSD8 | Arria 10 GX1150 | |
| CNN Model | AlexNet | AlexNet | AlexNet | AlexNet | AlexNet | |
| Data Format | 16-bit float | 32-bit float | 8-bit fixed | 8/16-bit fixed | 32-bit float | 8-bit fixed |
| Logic Utilization | 246K (58%) | 350K (82%) | 105K (25%) | N/A | 250K (59%) | 294k (69%) |
| Memory Utilization | 2487 (92%) | 2360 (86%) | 641 (24%) | N/A | 2472 (91%) | 2360 (87%) |
| DSP Utilization | 1476 (97%) | 1290 (85%) | 377 (25%) | N/A | 1518 (100%) | 759 (42%) |
| Inference Latency | 1 ms | 4 ms | 22 ms | 20 ms | 10 ms | 3.6 ms |
| $f_{CLK}$ | 303 MHz | 239 MHz | 250 MHz | 150 MHz | 202 MHz | 209 MHz |
| Recompil. Time | N/A | N/A | 3 hr | N/A | 0 hr | |
| Winograd | Yes | Yes | No | No | No | |
| Runtime Flexibility | No | No | No | No | Yes | |

As shown in Table 3, the Wang implementation can only achieve a limited DSP block utilization of 25% (vec_size=16, CU_NUM=16). It is observed in the evaluation that the tool fails to map the design with higher parallelism, mainly because of the large fan-out issue at the local memory buffer interfaces that causes routing congestion.

The Systolic-CNN accelerator outperforms the prior works Wang and Suda by 6.1× and 5.5×, respectively, in terms of inference latency. It should be noted that the Stratix-V FPGA used in Suda, although running at a lower system frequency, has more logic, memory, and DSP block resources than the Arria 10 FPGA used by the Systolic-CNN accelerator. The prior work in Wei shows a 2.5× better inference latency than the Systolic-CNN accelerator. This is because Wei adopts Winograd transformation (described in Andrew Lavin and Scott Gray, "Fast algorithms for convolutional neural networks," in *Proceedings of the IEEE Conference on Computer Vision and Pattern Recognition*, pp. 4013-4021, 2016), which promises to reduce the computational complexity of a convolution layer by a factor of 4× to further accelerate CNN inference. Aydonat only tests the AlexNet, however, the performance of mapping any other models were unknown. For a rough estimation, by introducing 16-bit floating-point, Winograd transformation, and batch processing mode as Aydonat does, latency can be improved by 2× (estimated), 4× (estimated) and 1.3× (actual), respectively. The total improvement (around 10×) can fill the current gap between Aydonat and Systolic-CNN.

While the prior work in Wei fails to fully utilize the available DSP block resource on the FPGA, Systolic-CNN shows better scalability and can achieve a 100% utilization of the DSP block resource (in the single-precision case) to fully take advantage of the FPGA device capability. In addition, while the OpenCL kernels of all the prior works are model-specific, Systolic-CNN is invariant to CNN models and has the runtime flexibility needed for handling the dynamic workload of accelerating different CNN models in multi-tenancy cloud/edge computing without the need of the recompilation nor redeployment of the FPGA kernel.

The Systolic-CNN results in Table 3 are measured with the batch processing mode turned off (batch size=1) for a fair comparison. The batch processing mode of Systolic-CNN can efficiently reduce the average latency of fully-connected layer computation. Since AlexNet has intensive computation in the fully-connected layers, one can enable the batch processing mode in Systolic-CNN (batch size=reuse_fac=4 in the case of the single-precision implementation) to improve the inference latency of the fully connected layers by 4×, which can further improve the average inference latency of the entire AlexNet by 1.3×.

In addition, the inference performance of running ResNet-50 and ResNet-152 with ImageNet dataset (224×224×3) classification tasks on Systolic-CNN is compared with prior FPGA-based accelerators, as shown in Table 4. Here, two prior works that achieve 100% DSP resource utilization are used for comparison, referred to as Ma (described in Y. Ma, Y. Cao, S. Vrudhula, and J.-s. Seo, "Optimizing the Convolution Operation to Accelerate Deep Neural Networks on FPGA," in *IEEE Transactions on Very Large Scale Integration (VLSI) Systems*, vol. 26, no. 7, pp. 1354-1367, 2018) and Azizimazreah (described in A. Azizimazreah and L. Chen, "Shortcut Mining: Exploiting Cross-Layer Shortcut Reuse in DCNN Accelerators," in 2019 *IEEE International Symposium on High Performance Computer Architecture (HPCA)*, pp. 94-105. IEEE, 2019). Ma is an RTL-level fine-grained accelerator design with design variables quantitatively investigated, while Azizimazreah focuses more on leveraging the off-chip feature map traffic with high-level synthesis (HLS) design flow.

TABLE 4

ResNet Inference Comparison Of FPGA-Based Accelerators With 100% DSP Resource Utilization

| Work | Ma | Ma | Azizimazreah | Systolic-CNN | |
|---|---|---|---|---|---|
| CNN Model | ResNet-50 | ResNet-152 | ResNet-152 | ResNet-50 | ResNet-152 |
| Data Format | 16-bit fixed | 16-bit fixed | 16-bit fixed | 32-bit float | 32-bit float |
| FPGA | Arria 10 GX1150 | Arria 10 GX1150 | Virtex-7 485T | Arria 10 GX1150 | |
| Logic Utilization | 221K/427K (52%) | 235K/427K (55%) | 372K/433K (86%) | 250K/427K (59%) | |
| Memory Utilization | 1931/2713 (71%) | 2365/2713 (87%) | 2039/2060 (99%) | 2472/2713 (91%) | |
| DSP Utilization | 1518/1518 (100%) | 1518/1518 (100%) | 2800/2800 (100%) | 1518/1518 (100%) | |
| $f_{CLK}$ | 200 MHz | 200 MHz | 150 MHz | 202 MHz | |
| Inference Latency | 13 ms | 32 ms | 35 ms | 84 ms | 202 ms |
| Accuracy Degradation | <2% | <2% | <1% | 0% | |
| Implementation Method | Verilog | Verilog | C/C++ HLS | OpenCL | |
| Winograd | No | No | No | No | |
| Recompilation | Yes | Yes | Yes | No | |

For Systolic-CNN, the same kernel used for AlexNet is used to run the ResNet-50 and ResNet-152 model with no need for recompilation. In terms of the data format and accuracy rate, 32-bit floating-point Systolic-CNN has no accuracy degradation, while Ma and Azizimazreah with a 16-bit fixed-point data format can lead up to a 2% accuracy drop. As CNN grows deeper, it targets more on error-sensitive applications. Systolic-CNN is the one more suitable for supporting error-sensitive applications in a multi-tenancy cloud/edge computing environment.

Ma performs 6× better than Systolic-CNN in terms of inference latency, which reflects the performance gap between the two data formats. As 32-bit floating- to fixed-point conversion can introduce 2.5× speedup and 32-bit fixed-point to 16-bit fixed-point can offer another 2× speedup, 5× speedup in total can almost fill the gap of the latency performance between Ma and Systolic-CNN. At the same time, Systolic-CNN enjoys no recompilation and zero accuracy degradation. Azizimazreah also shows 6× better inference latency than Systolic-CNN. Besides the data format difference between Azizimazreah and Systolic-CNN, Azizimazreah has 2× DSP block resources on its FPGA board. Considering both the data format and on-board DSP resource projection, Systolic-CNN performs better than Azizimazreah in terms of both latency and accuracy performance.

Table III summarizes the performance of the Systolic-CNN accelerator evaluated on five different CNN models—AlexNet, ResNet-50, ResNet-152, RetinaNet and Light-weight RetinaNet with Intel Arria 10 and Stratix 10 FPGA, respectively. The evaluation on the same FPGA is done without any recompilation. The inference latency of RetinaNet/Light-weight RetinaNet is measured based on the COCO dataset (described in T.-Y. Lin, M. Maire, S. Belongie, J. Hays, P. Perona, D. Ramanan, P. Dollár, and C. L. Zitnick, "Microsoft COCO: Common Objects in Context," in *European Conference on Computer Vision*, pp. 740-755, Springer, 2014) with an input size of 800×800×3 for the object detection task. The DSP block utilization of both implementations is over 90%, which validates the efficiency of the proposed architecture parameter exploration. In addition, a 2×-3× constant latency improvement is shown between the same model mapped onto two FPGA boards, reflecting the scalability of the proposed Systolic-CNN.

TABLE 5

Inference Performance of Running Different Models on Systolic-CNN Accelerators

| FPGA Board | Arria 10 GX1150 | Stratix 10 GX2800 |
|---|---|---|
| Logic Utilization | 250K/427K (59%) | 562K/933K (60%) |
| Memory Utilization | 2472/2713 (91%) | 9611/11721 (82%) |
| DSP Utilization | 1518/1518 (100%) | 5240/5760 (91%) |

| | $f_{CLK}$ | | | | | | | | |
|---|---|---|---|---|---|---|---|---|---|
| | 200 MHz | | | | | 172 MHz | | | |
| CNN Model | Alex Net | Res Net-50 | Res Net-152 | Retina Net | LW-Retina Net | Alex Net | Res Net-50 | Res Net-152 | Retina Net | LW-Retina Net |
| GFLOPs | 1.4 | 8 | 22 | 312 | 178 | 1.4 | 8 | 22 | 312 | 178 |
| Latency (ms) | 7 | 84 | 202 | 1615 | 900 | 2 | 33 | 73 | 873 | 498 |

In summary, when mapped with the single-precision floating-point data format, the Systolic-CNN accelerator can achieve an average inference latency of 7 ms/2 ms, 84 ms/33 ms, 202 ms/73 ms, 1615 ms/873 ms, and 900 ms/498 ms per image for running AlexNet, ResNet-50, ResNet-152, RetinaNet, and Light-weight RetinaNet on Arria/Stratix 10 FPGA board, respectively. The peak computational throughput is measured at 80-210 GFLOPS/s and 242-700 GFLOPS/s for accelerating different single-precision CNN models on Arria/Stratix 10 FPGA board. Since the current Systolic-CNN architecture is compatible for Winograd-based convolutions, some embodiments include support for Winograd-based CNN models to further improve inference latency performance.

VI. Process for Accelerating a CNN Process

Figure 15:
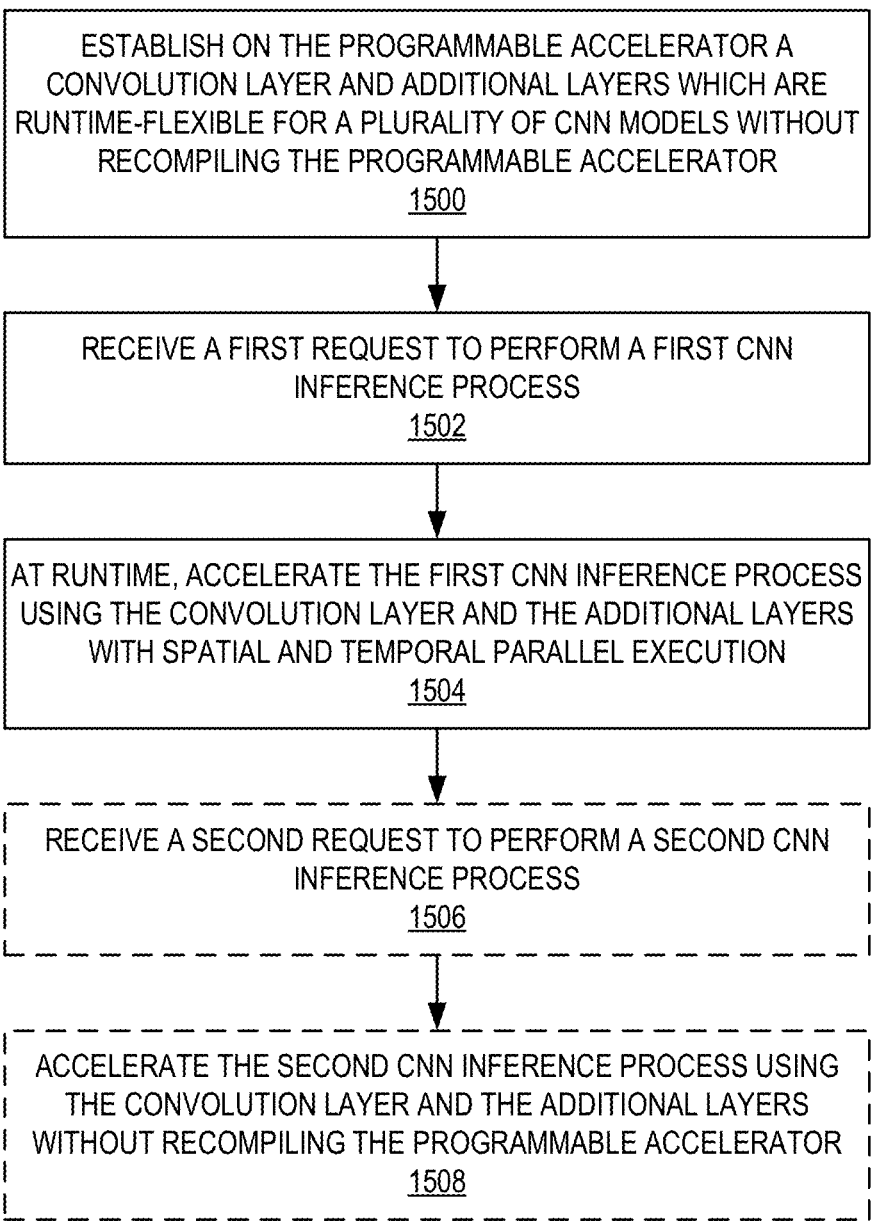
FIG. 15 is a flow diagram illustrating a process for accelerating a CNN process on a programmable accelerator, such as an FPGA.

FIG. 15 is a flow diagram illustrating a process for accelerating a CNN process on a programmable accelerator, such as an FPGA. Dashed boxes represent optional steps. The process begins at operation 1500, with establishing on the programmable accelerator a convolution layer and additional layers which are runtime-flexible for a plurality of CNN models without recompiling the programmable accelerator. In an exemplary aspect, the additional layers include some or all of the layers described with respect to FIG. 4. These additional layers may be selected at runtime according to the type of CNN being run, and the layers may be cascaded such that layers not selected provide data pass-through. The process continues at operation 1502, with receiving a first request to perform a first CNN inference process. The process continues at operation 1504, with, at runtime, accelerating the first CNN inference process using the convolution layer and the additional layers with spatial and temporal parallel execution.

The process optionally continues at operation 1506, with receiving a second request to perform a second CNN inference process. One or both of the CNN inference processes may use an additional layer which the other does not use. The CNN inference processes may perform different types of inferences. The process optionally continues at operation 1508, with accelerating the second CNN inference process using the convolution layer and the additional layers without recompiling the programmable accelerator.

Although the operations of FIG. 15 are illustrated in a series, this is for illustrative purposes and the operations are not necessarily order dependent. Some operations may be performed in a different order than that presented. Further, processes within the scope of this disclosure may include fewer or more steps than those illustrated in FIG. 15.

VII. Deep Learning System

Figure 16:
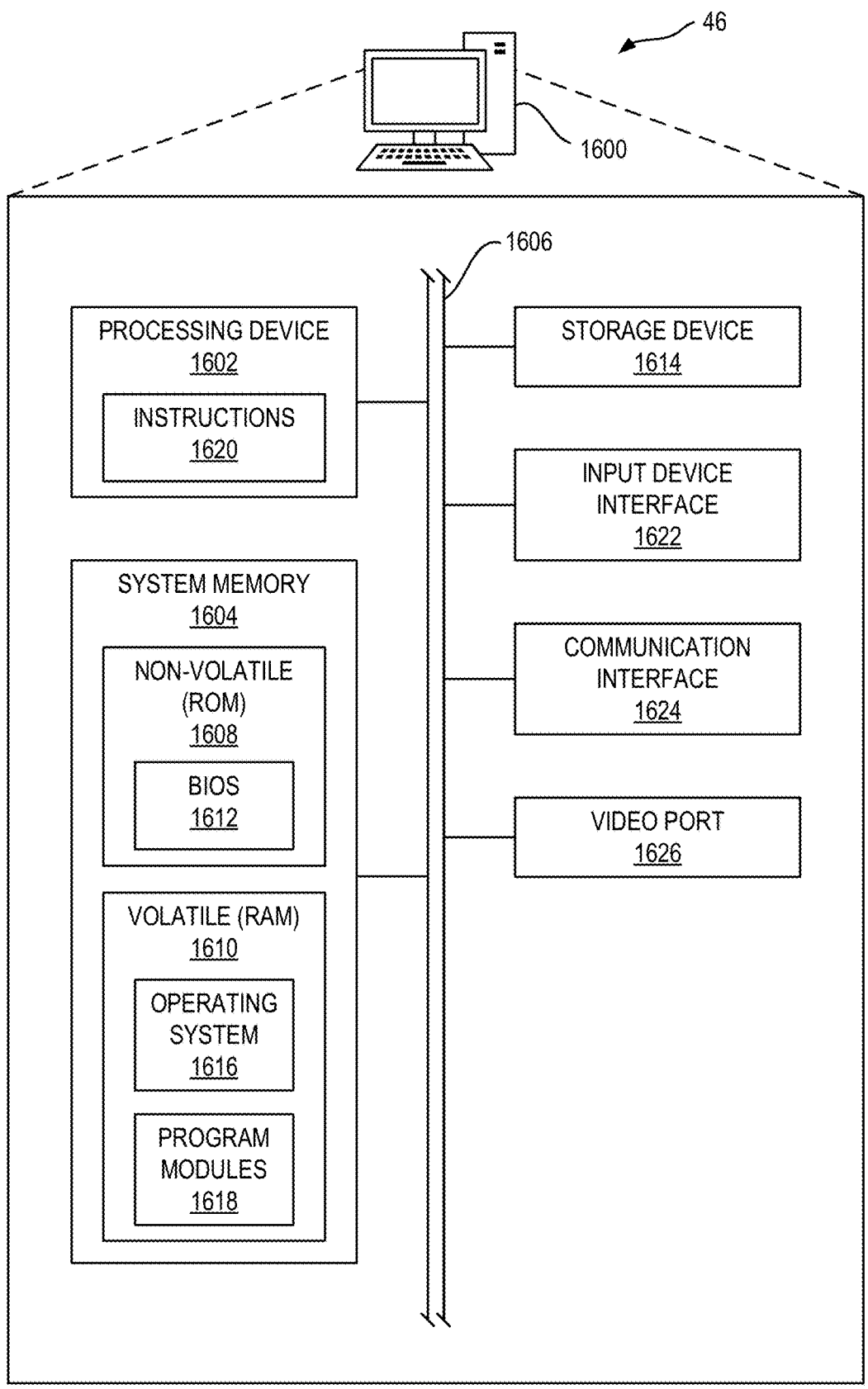
FIG. 16 is a block diagram of a deep learning system suitable for implementing Systolic-CNN according to embodiments disclosed herein.

FIG. 16 is a block diagram of a deep learning system 46 suitable for implementing Systolic-CNN according to embodiments disclosed herein. The deep learning system 46 includes or is implemented as a computer system 1600, which comprises any computing or electronic device capable of including firmware, hardware, and/or executing software instructions that could be used to perform any of the methods or functions described above, such as accelerating a CNN process on a programmable accelerator. In this regard, the computer system 1600 may be a circuit or circuits included in an electronic board card, such as a printed circuit board (PCB), a server, a personal computer, a desktop computer, a laptop computer, an array of computers, a personal digital assistant (PDA), a computing pad, a mobile device, or any other device, and may represent, for example, a server or a user's computer.

The exemplary computer system 1600 in this embodiment includes a processing device 1602 or processor, a system memory 1604, and a system bus 1606. The system memory 1604 may include non-volatile memory 1608 and volatile memory 1610. The non-volatile memory 1608 may include read-only memory (ROM), erasable programmable read-only memory (EPROM), electrically erasable programmable read-only memory (EEPROM), and the like. The volatile memory 1610 generally includes random-access memory (RAM) (e.g., dynamic random-access memory (DRAM), such as synchronous DRAM (SDRAM)). A basic input/output system (BIOS) 1612 may be stored in the non-volatile memory 1608 and can include the basic routines that help to transfer information between elements within the computer system 1600.

The system bus 1606 provides an interface for system components including, but not limited to, the system memory 1604 and the processing device 1602. The system bus 1606 may be any of several types of bus structures that may further interconnect to a memory bus (with or without a memory controller), a peripheral bus, and/or a local bus using any of a variety of commercially available bus architectures.

The processing device 1602 represents one or more commercially available or proprietary general-purpose processing devices, such as a microprocessor, CPU, or the like. In an exemplary aspect, the processing device is a host processor running a host application which uses a programmable accelerator implementing Systolic-CNN for CNN acceleration. More particularly, the processing device 1602 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processing device 1602 is configured to execute processing logic instructions for performing the operations and steps discussed herein.

In this regard, the various illustrative logical blocks, modules, and circuits described in connection with the embodiments disclosed herein may be implemented or performed with the processing device 1602, which may be a microprocessor, FPGA, a DSP, an application-specific integrated circuit (ASIC), or other programmable logic device, a discrete gate or transistor logic, discrete hardware components, or any combination thereof designed to perform the functions described herein. Furthermore, the processing device 1602 may be a microprocessor, or may be any conventional processor, controller, microcontroller, or state machine. The processing device 1602 may also be implemented as a combination of computing devices (e.g., a combination of a DSP and a microprocessor, a plurality of microprocessors, one or more microprocessors in conjunction with a DSP core, or any other such configuration).

The computer system 1600 may further include or be coupled to a non-transitory computer-readable storage medium, such as a storage device 1614, which may represent an internal or external hard disk drive (HDD), flash memory, or the like. The storage device 1614 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as optical disks, magnetic cassettes, flash memory cards, cartridges, and the like, may also be used in the operating environment, and, further, that any such media may contain computer-executable instructions for performing novel methods of the disclosed embodiments.

An operating system 1616 and any number of program modules 1618 or other applications can be stored in the volatile memory 1610, wherein the program modules 1618 represent a wide array of computer-executable instructions corresponding to programs, applications, functions, and the like that may implement the functionality described herein in whole or in part, such as through instructions 1620 on the processing device 1602. The program modules 1618 may also reside on the storage mechanism provided by the storage device 1614. As such, all or a portion of the functionality described herein may be implemented as a computer program product stored on a transitory or non-transitory computer-usable or computer-readable storage medium, such as the storage device 1614, volatile memory 1610, non-volatile memory 1608, instructions 1620, and the like. The computer program product includes complex programming instructions, such as complex computer-readable program code, to cause the processing device 1602 to carry out the steps necessary to implement the functions described herein.

An operator, such as the user, may also be able to enter one or more configuration commands to the computer system 1600 through a keyboard, a pointing device such as a mouse, or a touch-sensitive surface, such as the display device, via an input device interface 1622 or remotely through a web interface, terminal program, or the like via a communication interface 1624. The communication interface 1624 may be wired or wireless and facilitate communications with any number of devices via a communications network in a direct or indirect fashion. An output device, such as a display device, can be coupled to the system bus 1606 and driven by a video port 1626. Additional inputs and outputs to the computer system 1600 may be provided through the system bus 1606 as appropriate to implement embodiments described herein.

The operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined.

Those skilled in the art will recognize improvements and modifications to the preferred embodiments of the present disclosure. All such improvements and modifications are considered within the scope of the concepts disclosed herein and the claims that follow.

What is claimed is:

1. A method for accelerating a convolutional neural network (CNN) process on a programmable accelerator, the method comprising:

establishing on the programmable accelerator a convolution layer and additional layers which are runtime-flexible for a plurality of CNN models without recompiling the programmable accelerator using optimized values of at least three architectural parameters selected such that the programmable accelerator utilizes up to 100% of available computing resources and reduces runtime relative to using non-optimized values of the at least three architectural parameters, wherein each of the at least three architectural parameters has a different impact on a demand for the available computing resources;

receiving a first request to perform a first CNN inference process; and at runtime, accelerating the first CNN inference process using the convolution layer and the additional layers with spatial and temporal parallel execution, wherein the at least three architectural parameters comprise: pe_num, reuse_fac, and vec_fac, wherein:

the pe_num parameter defines a number of processing elements (PEs) in a one-dimensional (1-D) systolic array of PEs that perform temporally paralleled convolution in a deep pipeline and a parallelism of output feature maps (OFMs);

the reuse_fac parameter defines a parallelism of inner product (IP) units inside each of the PEs and a number of times an identical input feature map (IFM) is reused by each of the PEs for convolution computation within an identical OFM; and the vec_fac parameter defines a single instruction multiple data (SIMD) width of a partial computation between a weight vector and IFM vector across different channels inside each IP unit in each of the PEs.

2. The method of claim 1, further comprising:
receiving a second request to perform a second CNN inference process; and
accelerating the second CNN inference process using the convolution layer and the additional layers without recompiling the programmable accelerator.

3. The method of claim 2, wherein the first CNN inference process uses at least one of the additional layers which the second CNN inference process does not use.

4. The method of claim 2, wherein the second CNN inference process performs a type of inference which is distinct from the first CNN inference process.

5. The method of claim 1, wherein accelerating the first CNN inference process comprises executing data-independent loops on the convolution layer in parallel spatially.

6. The method of claim 5, wherein executing the data-independent loops of the convolutional layer in parallel spatially comprises executing the data-independent loops over different processing elements (PEs) of the programmable accelerator.

7. The method of claim 5, wherein accelerating the first CNN inference process comprises executing data-dependent loops of the convolutional layer in parallel temporally.

8. The method of claim 5, wherein the additional layers comprise two or more of a batch normalization (BNORM) layer, a local response normalization (LRN) layer, a max pooling layer, an average pooling layer, an element-wise sum (ELTWISE) layer, and a rectified linear unit (ReLU) layer.

9. The method of claim 1, wherein the programmable accelerator comprises a field-programmable gate array (FPGA).

10. A deep learning system, comprising:
a programmable accelerator; and
a memory storing instructions which, when executed, cause the programmable accelerator to:
establish processing resources on the programmable accelerator which are runtime-flexible for a plurality of convolutional neural network (CNN) models using optimized values of at least three architectural parameters selected such that the programmable accelerator utilizes up to 100% of available computing resources and reduces runtime relative to using non-optimized values of the at least three architectural parameters, wherein each of the at least three architectural parameters has a different impact on a demand for the available computing resources;
receive a request to perform a CNN inference process using one of the plurality of CNN models; and
perform the CNN inference process with the processing resources without recompiling the programmable accelerator,
wherein the at least three architectural parameters comprise: pe_num, reuse_fac, and vec_fac, wherein:
the pe_num parameter defines a number of processing elements (PEs) in a one-dimensional (1-D) systolic array of PEs that perform temporally paralleled convolution in a deep pipeline and a parallelism of output feature maps (OFMs);
the reuse_fac parameter defines a parallelism of inner product (IP) units inside each of the PEs and a number of times an identical input feature map (IFM) is reused by each of the PEs for convolution computation within an identical OFM; and
the vec_fac parameter defines a single instruction multiple data (SIMD) width of a partial computation between a weight vector and IFM vector across different channels inside each IP unit in each of the PEs.

11. The deep learning system of claim 10, wherein the processing resources comprise a convolution layer and additional layers.

12. The deep learning system of claim 10, wherein the programmable accelerator comprises a field-programmable gate array (FPGA).

13. The deep learning system of claim 10, wherein the deep learning system further comprises:
an off-chip memory coupled to the programmable accelerator; and
a host processor configured to provide the request to perform the CNN inference process to the programmable accelerator.

14. The deep learning system of claim 13, wherein the processing resources comprise a shift register-based input feature map (IFM) buffer for storing IFM data received from the off-chip memory.

15. A convolutional neural network (CNN) accelerator architecture, comprising:
a one-dimensional (1-D) systolic array of processing elements (PEs) configured to execute a convolution layer of a CNN; and
an additional layer module configured to provide optional computations for the CNN;
wherein the CNN accelerator architecture is configured to accelerate a plurality of types of CNNs on a programmable accelerator at runtime without reconfiguring the programmable accelerator using optimized values of at least three architectural parameters selected such that the programmable accelerator utilizes up to 100% of available computing resources and reduces runtime relative to using non-optimized values of the at least three architectural parameters, wherein each of the at least three architectural parameters has a different impact on a demand for the available computing resources,
wherein the at least three architectural parameters comprise: pe_num, reuse_fac, and vec_fac, wherein:
the pe_num parameter defines a number of PEs in the 1-D systolic array of PEs that perform temporally paralleled convolution in a deep pipeline and a parallelism of output feature maps (OFMs);
the reuse_fac parameter defines a parallelism of inner product (IP) units inside each of the PEs and a number of times an identical input feature map (IFM) is reused by each of the PEs for convolution computation within an identical OFM; and
the vec_fac parameter defines a single instruction multiple data (SIMD) width of a partial computation between a weight vector and IFM vector across different channels inside each IP unit in each of the PEs.

16. The CNN accelerator architecture of claim 15, wherein the additional layer module comprises one or more of a batch normalization (BNORM) layer, a local response normalization (LRN) layer, a max pooling layer, an average pooling layer, an element-wise sum (ELTWISE) layer, and a rectified linear unit (ReLU) layer.

17. The CNN accelerator architecture of claim 15, wherein the additional layer module comprises multiple computation layers which are selected at runtime according to a type of CNN selected.

18. The CNN accelerator architecture of claim 17, wherein the multiple computation layers are cascaded such that a computation layer not selected provides data pass-through.

19. The CNN accelerator architecture of claim 15, further comprising a buffer configured to store an input feature map (IFM) for the CNN received from an external memory.

20. The CNN accelerator architecture of claim 19, wherein the buffer is a shift register-based buffer.

* * * * *